United States Patent
Miller et al.

(10) Patent No.: US 10,442,547 B2
(45) Date of Patent: Oct. 15, 2019

(54) ENGINE AND ELECTRICAL MACHINE HEALTH MONITORING

(71) Applicant: General Electric Company, Schenectady, NY (US)

(72) Inventors: Brandon Wayne Miller, Liberty Township, OH (US); Sridhar Adibhatla, Glendale, OH (US); Michael Thomas Gansler, Mason, OH (US)

(73) Assignee: General Electric Company, Schenectady, NY (US)

( * ) Notice: Subject to any disclaimer, the term of this patent is extended or adjusted under 35 U.S.C. 154(b) by 93 days.

(21) Appl. No.: 15/629,952

(22) Filed: Jun. 22, 2017

(65) Prior Publication Data

US 2018/0370651 A1    Dec. 27, 2018

(51) Int. Cl.
*B64D 45/00* (2006.01)
*F01D 21/00* (2006.01)
(Continued)

(52) U.S. Cl.
CPC ............. *B64D 45/00* (2013.01); *B60L 3/12* (2013.01); *B64D 27/10* (2013.01); *B64D 27/12* (2013.01); *B64D 27/16* (2013.01); *B64D 27/24* (2013.01); *F01D 21/003* (2013.01); *G01M 15/14* (2013.01); *G05B 23/0283* (2013.01);
(Continued)

(58) Field of Classification Search
CPC ........ B64D 45/00; B64D 27/12; B64D 27/24; B64D 2045/0085; B64D 2027/026; B60L 3/12; B60L 2200/10; G07C 5/0808; G07C 5/006; B64F 5/60; G05B 23/0283; G01M 15/14; F01D 21/003; F05D 2220/323; F05D 2220/76; F05D 2270/309; F05D 2270/335; F05D 2260/80; F05D 2260/821

See application file for complete search history.

(56) References Cited

U.S. PATENT DOCUMENTS 5,018,069 A   5/1991  Pettigrew
5,608,627 A   3/1997  Lecomte et al.
(Continued)

FOREIGN PATENT DOCUMENTS

EP   2 378 085 A2   10/2011
EP   3 012 439 A1    4/2016
WO   2016/193603 A1  12/2016

OTHER PUBLICATIONS

Extended European Search Report and Opinion issued in connection with corresponding EP Application No. 18178108.9 dated Nov. 27, 2018.

*Primary Examiner* — Russell Frejd
(74) *Attorney, Agent, or Firm* — Dority & Manning, P.A.

(57) ABSTRACT

Systems and methods for estimating engine and electrical machine health are provided. The systems and methods therefore include features that provide for improved health estimates of one or more engines and/or electrical machines of one or more engines having an electrical machine embedded therein or coupled thereto. In particular, the systems and methods therefore include features for utilizing sensed or measured operating parameters of the electrical machines and/or operating parameters of the prime mover to estimate the health of the prime mover and/or the electrical machines embedded therein or coupled thereto.

20 Claims, 11 Drawing Sheets

(51) Int. Cl.

| | | |
|---|---|---|
| *G01M 15/14* | (2006.01) | |
| *G05B 23/02* | (2006.01) | |
| *B60L 3/12* | (2006.01) | |
| *B64D 27/12* | (2006.01) | |
| *B64D 27/24* | (2006.01) | |
| *G07C 5/08* | (2006.01) | |
| *B64D 27/10* | (2006.01) | |
| *B64D 27/16* | (2006.01) | |
| *B64D 27/02* | (2006.01) | |

(52) U.S. Cl.
CPC ........ *G07C 5/0808* (2013.01); *B60L 2200/10* (2013.01); *B64D 2027/026* (2013.01); *B64D 2045/0085* (2013.01); *B64D 2221/00* (2013.01); *F05D 2220/323* (2013.01); *F05D 2220/76* (2013.01); *F05D 2260/80* (2013.01); *F05D 2260/821* (2013.01); *F05D 2270/309* (2013.01); *F05D 2270/335* (2013.01)

(56) References Cited

U.S. PATENT DOCUMENTS

| | | |
|---|---|---|
| 5,627,758 A | 5/1997 | Lansbeny et al. |
| 6,408,258 B1 | 6/2002 | Richer |
| 7,031,812 B1 | 4/2006 | Pettigrew et al. |
| 8,321,118 B2 | 11/2012 | Moeckly et al. |
| 8,417,410 B2 | 4/2013 | Moeckly et al. |
| 8,437,904 B2 | 5/2013 | Mansouri et al. |
| 2007/0064458 A1* | 3/2007 | Trainer ............... H02P 9/00 363/102 |
| 2014/0271114 A1* | 9/2014 | Phillips ............ G05B 23/0294 415/1 |
| 2015/0177106 A1 | 6/2015 | Fuller et al. |
| 2015/0369138 A1* | 12/2015 | Phillips ............... F02C 7/32 701/100 |
| 2016/0103162 A1 | 4/2016 | Safa-Bakhsh et al. |
| 2016/0107768 A1 | 4/2016 | Nicks et al. |
| 2016/0304211 A1 | 10/2016 | Swann |
| 2016/0325629 A1 | 11/2016 | Siegel et al. |
| 2018/0357840 A1* | 12/2018 | Gansler ............... G07C 5/0808 |

* cited by examiner

ENGINE AND ELECTRICAL MACHINE HEALTH MONITORING

FIELD

The present subject matter relates generally to gas turbine engines having electrical machines embedded therein or coupled thereto, and more particularly to health monitoring of such gas turbine engines and electrical machines.

BACKGROUND

Typical aircraft propulsion systems include one or more gas turbine engines. For certain propulsion systems, the gas turbine engines generally include a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Certain gas turbine engines can include electrical machines embedded therein or coupled thereto that can be electric generators, electric motors, or a combination generator/motor. Such electric generators can be used to power supplemental propulsive systems, such as e.g., electric fans, or can be used to supply power to other aircraft systems. When configured as or functioning as an electric motor, such electrical machines can be used as starter motors for gas turbine engines, among other possible uses.

Gas turbine engines and electrical machines embedded therein or coupled thereto deteriorate over their respective service lives. Conventionally, engine health and electrical machine health have been predicted and assessed based on hours of service or other prognostication methods. However, not all service hours place the same amount of wear and tear on the engines and electrical machines. Accordingly, conventional methods for assessing engine and electrical machine health sometimes produce imprecise and sometimes inaccurate assessments of health. In addition, based on such imprecise or inaccurate assessments, servicing of the engine and/or electrical machines can needlessly be scheduled, or in some cases, not be scheduled soon enough. Moreover, many times engine and electrical machine health estimates are generally not provided in real time and thus adjustments to such deterioration cannot be made in real time, leading to less than optimal engine and/or electrical machine efficiency.

Accordingly, improved systems and methods for assessing engine and electrical machine health that address one or more of these challenges would be useful.

BRIEF DESCRIPTION

Aspects and advantages of the invention will be set forth in part in the following description, or may be obvious from the description, or may be learned through practice of the invention.

In one exemplary aspect, a method for monitoring the health of at least one of a prime mover and an electrical machine coupled with the prime mover is provided. The method includes measuring a response to a change in torque on the electrical machine, the response indicative of a change in one or more operating parameters of at least one of the prime mover and the electrical machine. The method also includes determining a health estimate of at least one of the electrical machine and the prime mover based at least in part on the response.

In some exemplary embodiments, prior to measuring the response, the method further includes pulsing the electrical machine for a predetermined time to induce the change in torque on the electrical machine.

In some exemplary embodiments, after determining the health estimate, the method further includes providing information to a user indicative of the health estimate of at least one of the prime mover and the electrical machine.

In some exemplary embodiments, after determining the health estimate, the method further includes scheduling a maintenance operation for at least one of the prime mover and the electrical machine in response to the determined health estimate.

In another exemplary aspect, a method for monitoring the health of at least one of a prime mover and an electrical machine coupled with the prime mover is provided. The method includes obtaining operating data indicative of one or more operating parameters of the electrical machine measured over a predetermined time during operation of the prime mover and the electrical machine. The method also includes generating a parameter function based at least in part on the operating data, wherein the parameter function is indicative of at least one of the operating parameters of the electrical machine trended over time. In addition, the method also includes determining a health estimate of at least one of the electrical machine and the prime mover based at least in part on the parameter function.

In some exemplary embodiments, the method further includes obtaining operating data indicative of one or more operating parameters of the prime mover measured over a predetermined time during operation of the prime mover and the electrical machine. The method also includes generating a parameter function based at least in part on the operating data, wherein the parameter function is indicative of at least one of the operating parameters of the prime mover trended over time. In addition, during determining, the health estimate is determined based at least in part on the parameter function of the electrical machine and the parameter function of the prime mover.

In some exemplary embodiments, after determining the health estimate, the method further includes providing information to a user indicative of the health estimate of at least one of the prime mover and the electrical machine.

In some exemplary embodiments, after determining the health estimate, the method further includes scheduling a maintenance operation for at least one of the prime mover and the electrical machine in response to the determined health estimate.

In yet another exemplary aspect, a gas turbine engine defining a radial direction and an axial direction is provided. The gas turbine engine includes a compressor section, a combustion section, and a turbine section arranged in serial flow order, the compressor section, the combustion section, and the turbine section at least partially defining a core air flowpath. The gas turbine engine also includes one or more sensors for sensing one or more operating parameters of the gas turbine engine during operation. The gas turbine engine further includes a rotary component rotatable with at least one of a portion of the compressor section and a portion of the turbine section. The gas turbine engine additionally includes a static frame member. The gas turbine engine also includes an electric machine rotatable with the rotary component, the electric machine mounted to the static frame member or coupled to the rotary component, or both. The gas turbine engine further includes a health monitoring system that includes one or more computing devices communicatively coupled with the electrical machine and the one or more sensors, the one or more computing devices comprising one or more processors and one or more memory devices, the one or more memory devices storing instructions that when executed by the one or more processors cause the one or more processors to perform operations, the one or more computing devices configured to: obtain one or more signals from the one or more sensors indicative of a response to a change in torque on the electrical machine, the response indicative of a change in one or more operating parameters of the gas turbine engine; compare the response to a baseline response; determine a delta between the response and the baseline response; and determine a health estimate of the gas turbine engine based at least in part on the delta between the response and the baseline response.

In some exemplary embodiments, the gas turbine engine further includes a power source. Prior to obtaining the one or more signals indicative of the response to the change in torque on the electrical machine, the computing device is further configured to send one or more signals to a power source to pulse the electrical machine for a predetermined time.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
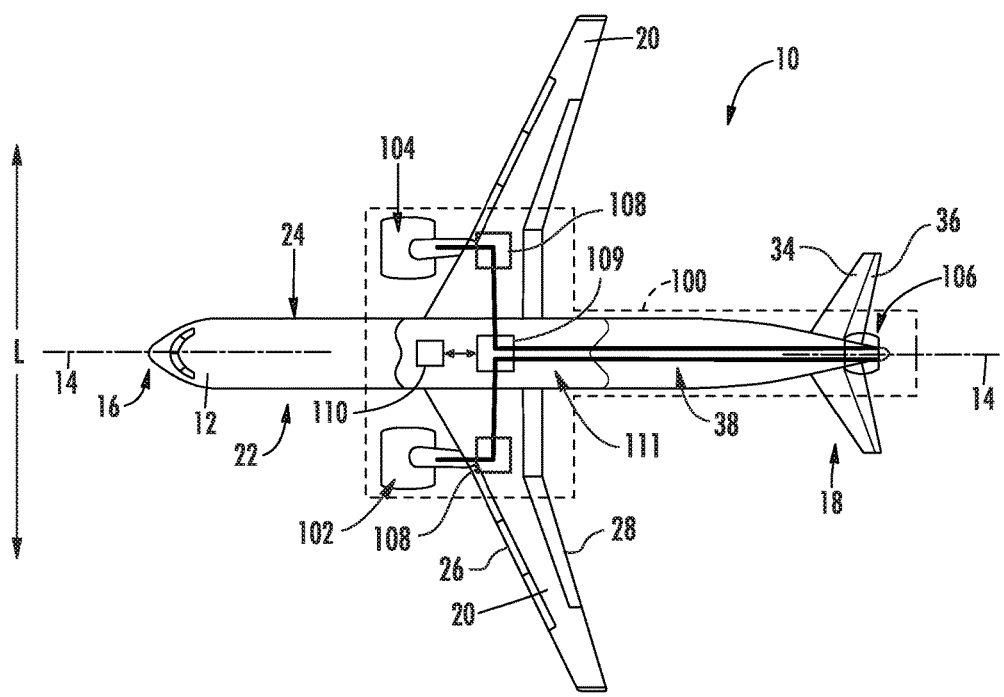
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a gas turbine engine, with forward referring to a position closer to an engine inlet and aft referring to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

The present application is directed generally to systems and methods for health monitoring of a prime mover and/or one or more electrical machines embedded therein or coupled thereto. In particular, the systems and methods therefore include features for utilizing sensed or measured operating parameters of the electrical machines and/or operating parameters of the prime mover to estimate the health of the prime mover, the electrical machines embedded therein or coupled thereto, and/or components thereof.

In one exemplary aspect, the prime mover can be one or more gas turbine engines of a propulsion system for an aircraft having one or more electrical machines embedded therein. In some embodiments, operating parameters of one or more electrical machines embedded within the one or more gas turbine engines are sensed over time during operation of the gas turbine engines. The sensed data is collected, normalized, and then trended over time to predict or estimate the health of the electrical machine(s) and/or gas turbine engine(s). In yet other embodiments, the sensed operating parameters of the electrical machines can be used in conjunction with sensed operating parameters of the gas turbine engines. In this way, the engine health of the gas turbine engines and/or the health of the electrical machines can be predicted or estimated based on data indicative of how the gas turbine engines are electrical machines embedded therein or coupled thereto are actually performing. With such data, improved health estimates of the electrical machines and/or gas turbine engines can be rendered.

In another exemplary aspect, in some exemplary embodiments, an increased load can be purposefully placed across one or more of the electrical machines embedded within or coupled with the gas turbine engines for a predetermined time (i.e., the electrical machines can be pulsed). Thereafter, a response to the increased load is measured. The response is indicative of a change in one or more operating parameters of the gas turbine engine and/or another electrical machine coupled thereto. The response is then utilized to make predictions as to the health of the gas turbine engines, the electrical machine, other electrical machines coupled embedded therein or coupled thereto, and/or components thereof.

It will be appreciated that the prime mover can be any suitable source of power, such as e.g., a gas turbine engine, a steam turbine engine, a reciprocating engine, aeroderivative engines, microturbines, fuel cells, wind turbine, etc. The electrical machine can be any suitable type of power extraction system. For example, the prime mover can be a wind turbine and the electrical machine embedded therein or coupled to the wind turbine can be an electrical generator. It will further be appreciated that the specific examples of prime movers and/or electrical machines disclosed herein are for example purposes only and are not intended to limit the appended claims in any aspect.

Figure 2:
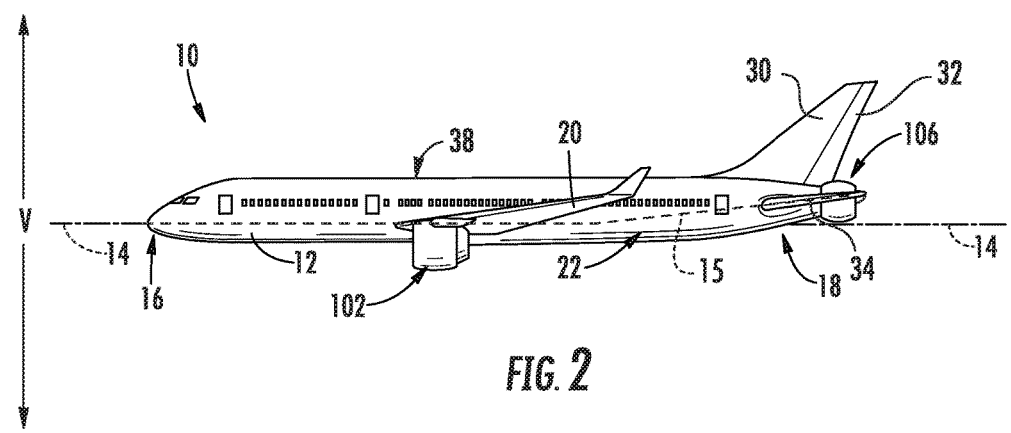
FIG. 2 is a port side view of the exemplary aircraft of FIG. 1.

Referring now to the drawings, FIG. 1 provides a top view of an exemplary aircraft 10 as may incorporate various embodiments of the present subject matter. FIG. 2 provides a port side view of the aircraft 10 as illustrated in FIG. 1. As shown in FIGS. 1 and 2, the aircraft 10 defines a longitudinal centerline 14 that extends therethrough, a vertical direction V, a lateral direction L, a forward end 16, and an aft end 18. Moreover, the aircraft 10 defines a mean line 15 extending between the forward end 16 and aft end 18 of the aircraft 10. As used herein, the "mean line" refers to a midpoint line extending along a length of the aircraft 10, not taking into account the appendages of the aircraft 10 (such as the wings 20 and stabilizers discussed below).

Moreover, the aircraft 10 includes a fuselage 12, extending longitudinally from the forward end 16 of the aircraft 10 towards the aft end 18 of the aircraft 10, and a pair of wings 20. As used herein, the term "fuselage" generally includes all of the body of the aircraft 10, such as an empennage of the aircraft 10. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Each of the wings 20 for the exemplary embodiment depicted includes one or more leading edge flaps 26 and one or more trailing edge flaps 28. The aircraft 10 further includes a vertical stabilizer 30 having a rudder flap 32 for yaw control (FIG. 2), and a pair of horizontal stabilizers 34, each having an elevator flap 36 for pitch control (FIG. 1). The fuselage 12 additionally includes an outer surface or skin 38. It should be appreciated however, that in other exemplary embodiments of the present disclosure, the aircraft 10 may additionally or alternatively include any other suitable configuration of stabilizers that may or may not extend directly along the vertical direction V or horizontal/lateral direction L.

The exemplary aircraft 10 of FIGS. 1 and 2 includes a propulsion system 100, herein referred to as "system 100". The exemplary system 100 includes one or more aircraft engines and one or more electric propulsion engines. For example, the embodiment depicted includes a plurality of aircraft engines, each configured to be mounted to the aircraft 10, such as to one of the pair of wings 20, and an electric propulsion engine. More specifically, for the embodiment depicted, the aircraft engines are configured as gas turbine engines, or rather as turbofan jet engines 102, 104 attached to and suspended beneath the wings 20 in an under-wing configuration. Additionally, the electric propulsion engine is configured to be mounted at the aft end of the aircraft 10, and hence the electric propulsion engine depicted may be referred to as an "aft engine." Further, the electric propulsion engine depicted is configured to ingest and consume air forming a boundary layer over the fuselage 12 of the aircraft 10. Accordingly, the exemplary aft engine depicted may be referred to as a boundary layer ingestion (BLI) fan 106. The BLI fan 106 is mounted to the aircraft 10 at a location aft of the wings 20 and/or the jet engines 102, 104. Specifically, for the embodiment depicted, the BLI fan 106 is fixedly connected to the fuselage 12 at the aft end 18, such that the BLI fan 106 is incorporated into or blended with a tail section at the aft end 18, and such that the mean line 15 extends therethrough. It should be appreciated, however, that in other embodiments the electric propulsion engine may be configured in any other suitable manner, and may not necessarily be configured as an aft fan or as a BLI fan.

Referring still to the embodiment of FIGS. 1 and 2, in certain embodiments the propulsion system 100 further includes one or more electrical machines, such as e.g., electric generators 108 operable with the jet engines 102, 104. For example, one or both of the jet engines 102, 104 may be configured to provide mechanical power from a rotating shaft (such as an LP shaft or HP shaft) to the electric generators 108. Although depicted schematically outside the respective jet engines 102, 104, in certain embodiments, the electric generators 108 may be positioned within a respective jet engine 102, 104. Additionally, the electric generators 108 may be configured to convert the mechanical power to electrical power. For the embodiment depicted, the propulsion system 100 includes an electric generator 108 for each jet engine 102, 104, and also includes a power conditioner 109 and an energy storage device 110. The electric generators 108 may send electrical power to the power conditioner 109, which may transform the electrical energy to a proper form and either store the energy in the energy storage device 110 or send the electrical energy to the BLI fan 106. For the embodiment depicted, the electric generators 108, power conditioner 109, energy storage device 110, and BLI fan 106 are all are connected to an electric communication bus 111, such that the electric generator 108 may be in electrical communication with the BLI fan 106 and/or the energy storage device 110 and such that the electric generator 108 may provide electrical power to one or both of the energy storage device 110, the BLI fan 106, or to other aircraft systems. Accordingly, in such an embodiment, the propulsion system 100 may be referred to as a gas-electric propulsion system.

It should be appreciated, however, that the aircraft 10 and propulsion system 100 depicted in FIGS. 1 and 2 is provided by way of example only and that in other exemplary embodiments of the present disclosure, any other suitable aircraft 10 may be provided having a propulsion system 100 configured in any other suitable manner. For example, it should be appreciated that in various other embodiments, the BLI fan 106 may alternatively be positioned at any suitable location proximate the aft end 18 of the aircraft 10. Further, in still other embodiments the electric propulsion engine may not be positioned at the aft end of the aircraft 10, and thus may not be configured as an "aft engine." For example, in other embodiments, the electric propulsion engine may be incorporated into the fuselage of the aircraft 10, and thus configured as a "podded engine," or pod-installation engine. Further, in still other embodiments, the electric propulsion engine may be incorporated into a wing of the aircraft 10, and thus may be configured as a "blended wing engine." Moreover, in other embodiments, the electric propulsion engine may not be a boundary layer ingestion fan, and instead may be mounted at any suitable location on the aircraft 10 as a freestream injection fan. Furthermore, in still other embodiments, the propulsion system 100 may not include, e.g., the power conditioner 109 and/or the energy storage device 110, and instead the generator(s) 108 may be directly connected to the BLI fan 106 and/or other aircraft systems.

Figure 3:
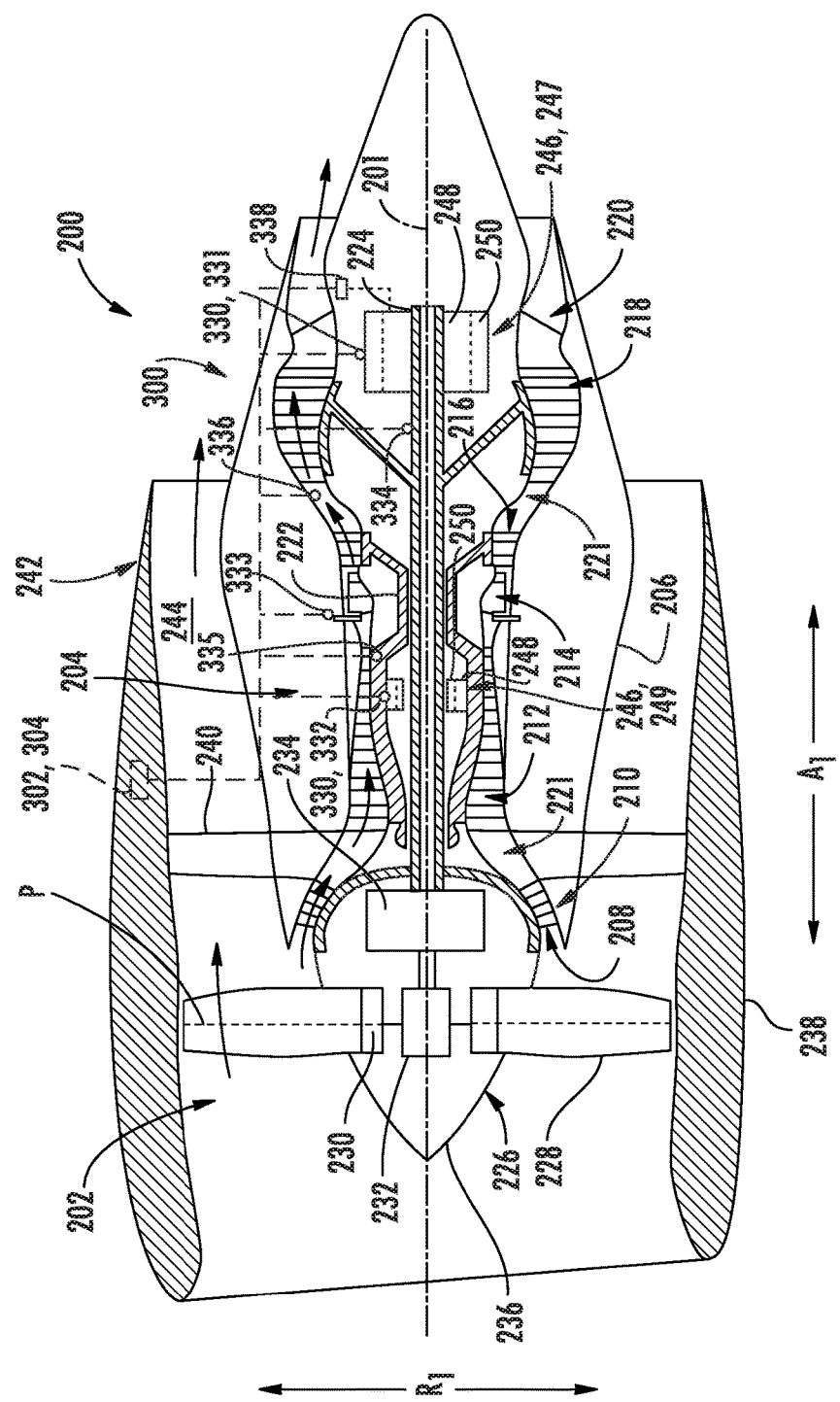
FIG. 3 is a schematic, cross-sectional view of a gas turbine engine in accordance with an exemplary aspect of the present disclosure.

FIG. 3 provides a schematic cross-sectional view of a propulsion engine in accordance with an exemplary embodiment of the present disclosure. In certain exemplary embodiments, the propulsion engine may be configured as a high-bypass turbofan jet engine, herein referred to as "turbofan engine 200." Notably, in at least certain embodiments, the jet engines 102, 104 may be also configured as high-bypass turbofan jet engines. In various embodiments, the turbofan engine 200 may be representative of jet engines 102, 104. Alternatively, however, in other embodiments, the turbofan engine 200 may be incorporated into any other suitable aircraft 10 or propulsion system 100.

As shown in FIG. 3, the turbofan engine 200 defines an axial direction A1 (extending parallel to a longitudinal centerline 201 provided for reference), a radial direction R1, and a circumferential direction C1 (extending about the axial direction A; not depicted in FIG. 3). In general, the turbofan engine 200 includes a fan section 202 and a core turbine engine 204 disposed downstream from the fan section 202.

The exemplary core turbine engine 204 depicted generally includes a substantially tubular outer casing 206 that defines an annular inlet 208. The outer casing 206 encases, in serial flow relationship, a compressor section including a booster or low pressure (LP) compressor 210 and a high pressure (HP) compressor 212; a combustion section 214; a turbine section including a high pressure (HP) turbine 216 and a low pressure (LP) turbine 218; and a jet exhaust nozzle section 220. The compressor section, combustion section 214, and turbine section together define a core air flowpath 221 extending from the annular inlet 208 through the LP compressor 210, HP compressor 212, combustion section 214, HP turbine section 216, LP turbine section 218 and jet nozzle exhaust section 220. A high pressure (HP) shaft or spool 222 drivingly connects the HP turbine 216 to the HP compressor 212. A low pressure (LP) shaft or spool 224 drivingly connects the LP turbine 218 to the LP compressor 210.

For the embodiment depicted in FIG. 3, the fan section 202 includes a variable pitch fan 226 having a plurality of fan blades 228 coupled to a disk 230 in a spaced apart manner. As depicted, the fan blades 228 extend outwardly from disk 230 generally along the radial direction R. Each fan blade 228 is rotatable relative to the disk 230 about a pitch axis P by virtue of the fan blades 228 being operatively coupled to a suitable actuation member 232 configured to collectively vary the pitch of the fan blades 228 in unison. The fan blades 228, disk 230, and actuation member 232 are together rotatable about the longitudinal axis 12 by LP shaft 224 across a power gear box 234. The power gear box 234 includes a plurality of gears for stepping down the rotational speed of the LP shaft 224 to a more efficient rotational fan speed.

Referring still to the exemplary embodiment of FIG. 3, the disk 230 is covered by rotatable spinner or front hub 236 that is aerodynamically contoured to promote an airflow through the plurality of fan blades 228. Additionally, the exemplary fan section 202 includes an annular fan casing or outer nacelle 238 that circumferentially surrounds the fan 226 and/or at least a portion of the core turbine engine 204. The nacelle 238 is supported relative to the core turbine engine 204 by a plurality of circumferentially-spaced outlet guide vanes 240. A downstream section 242 of the nacelle 238 extends over an outer portion of the core turbine engine 204 so as to define a bypass airflow passage 244 therebetween.

It should be appreciated that the exemplary turbofan engine 200 depicted in FIG. 3 is provided by way of example only, and that in other exemplary embodiments, the turbofan engine 200 may have any other suitable configuration. For example, the turbofan engine 200 may be configured as a turboprop engine, a turbojet engine, a differently configured turbofan engine, or any other suitable gas turbine engine.

Additionally, as shown in FIG. 3, for this embodiment, the turbofan engine 200 includes multiple electrical machines 246 embedded therein. Specifically, for the embodiment depicted, the electrical machines 246 of the turbofan engine 200 include a first electrical machine 247 and a second electrical machine 249. The first electrical machine 247 is rotatable with the fan 226. More particularly, the first electrical machine 247 is configured as an electric generator co-axially mounted to and rotatable with the LP shaft 224 (the LP shaft 224 also rotating the fan 226 through, for this embodiment, the power gearbox 234). The second electrical machine 249 is rotatable with the HP compressor and turbine 212, 216. More particularly, the second electrical machine 249 is configured as an electric generator co-axially mounted to and rotatable with the HP shaft 222. Notably, when the turbofan engine 200 is integrated into the propulsion system 100 described above with reference to FIGS. 1 and 2, the electric generators 108 may be configured in substantially the same manner as the electrical machines 246 of FIG. 3.

Figure 4:
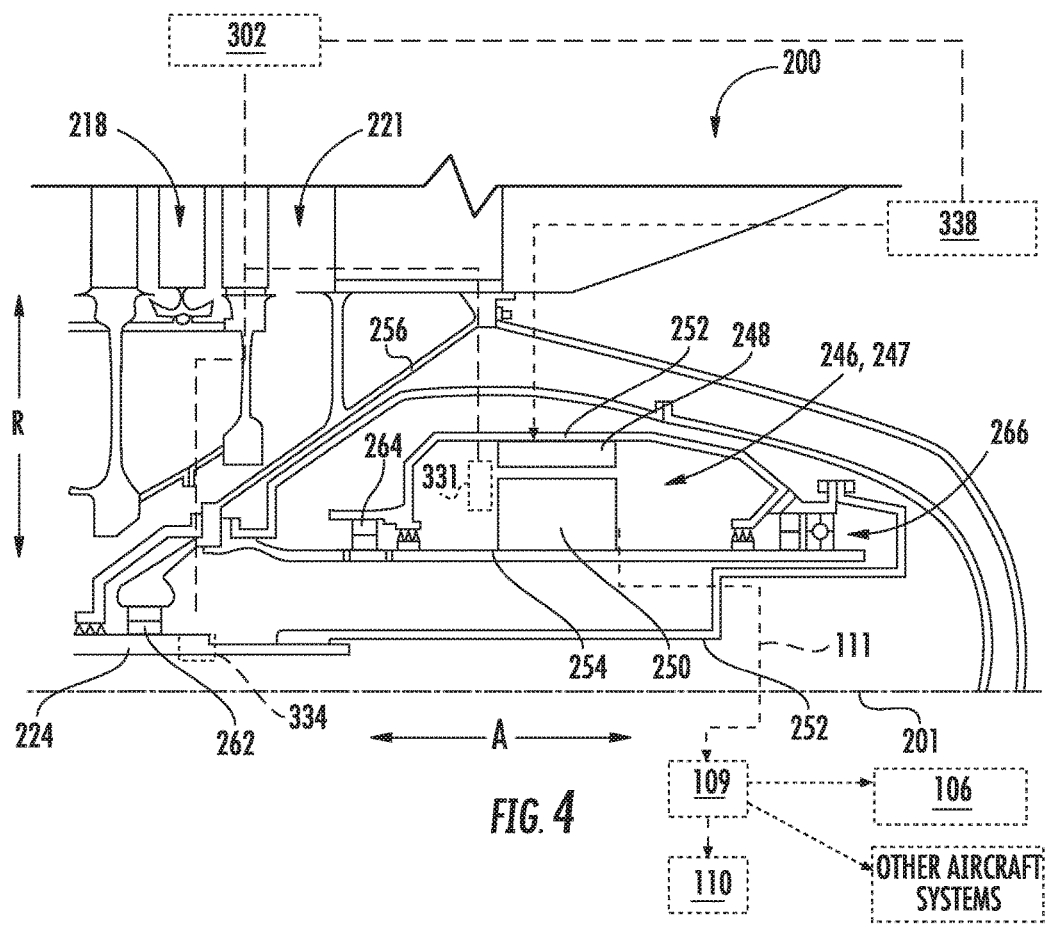
FIG. 4 is a schematic, cross-sectional view of an electric machine embedded in the gas turbine engine of FIG. 3.

Referring now to FIG. 4, a close up view of one of the electrical machines 246 embedded within the turbofan engine 200 of FIG. 3 is provided. More particularly, the first electrical machine 247 is depicted. For this embodiment, the first electrical machine 247 is embedded within the turbine section of the turbofan engine 200, and more particularly, the first electrical machine 247 is attached to the LP shaft 224 of the turbofan engine 200 as noted above. Additionally, the first electrical machine 247 is positioned at least partially within or aft of the turbine section along the axial direction A.

As further shown in FIG. 4, the first electrical machine 247 includes a rotor 248 and a stator 250. The rotor 248 is attached via a plurality of rotor connection members 252 directly to the LP shaft 224 such that the rotor 248 is rotatable with the LP shaft 224. By contrast, the stator 250 is attached via one or more stator connection members 254 to a static frame member of the turbofan engine 200, and more particularly, to a structural support member 256 of the turbofan engine 200. The structural support member 256 extends forward to support an aft bearing 262. The aft bearing 262 rotatably supports an aft end of the LP shaft 224.

As further depicted in FIG. 4, the stator connection member 254 may be an annular/cylindrical member extending from the structural support member 256 of the turbofan engine 200. For this embodiment, the stator connection member 254 supports rotation of the rotor 248 and rotor connection members 252 through one or more bearings. More specifically, a forward electric machine bearing 264 is positioned forward of the electric machine 246 and between the rotor connection member 252 and the stator connection member 254 along the radial direction R. Similarly, an aft electric machine bearing 266 is positioned aft of the first electrical machine 247 and between the rotor connection member 252 and the stator connection member 254 along the radial direction R. Particularly, for this embodiment, the forward electric machine bearing 264 is configured as a roller element bearing and the aft electric machine bearing 266 includes a pair of bearings, the pair of bearings configured as a roller element bearing and a ball bearing. It should be appreciated, however, that the forward and aft electric machine bearings 264, 266 may in other embodiments have any other suitable configuration and that the present disclosure is not intended to be limited to the specific configuration depicted.

Notably, in at least certain exemplary embodiments, the first electrical machine 247 may be one of the exemplary electric generators 108 of FIGS. 1 and 2. In such embodiments, a rotation of the rotor 248 relative to the stator 250 may generate electrical power, which may be transferred via an electric communication bus 111 to the power conditioner 109 for conditioning the power and then to one or more systems of the turbofan engine 200, such as e.g., the energy storage device 110, the BLI fan 106, or other aircraft systems as shown schematically in FIG. 4. Although not shown in FIG. 4, the second electrical machine 249 can be coupled with the HP shaft 222 in the same or similar manner as noted above for the coupling of the first electrical machine 247 with the LP shaft 224.

Referring again to FIG. 3, for this embodiment, the turbofan engine 200 includes a health monitoring system 300 for monitoring the health of the turbofan engine 200 and/or the electrical machines 246 embedded therein. As shown, the health monitoring system 300 includes one or more computing devices 302 (only one shown in FIG. 3) and various sensors for collecting data, and in particular, operating parameters of the turbofan engine 200 and/or operating parameters of the electrical machines 246.

For the illustrated embodiment of FIG. 3, the computing device 302 is an engine controller 302. Each turbofan engine 200 of the aircraft 10 can include an engine controller 304 and the engine controllers 304 can be communicatively coupled via any suitable wired and/or wireless connection with one another and/or other computing devices 302 of the aircraft 10, such as e.g., a mission computer, a flight management computer, etc. Each engine controller 304 can be, for example, an Electronic Engine Controller (EEC) or a Digital Engine Controller (DEC) of a Full Authority Digital Engine Control (FADEC) system. For the embodiment depicted, the engine controller 304 is positioned along the outer nacelle 238 and is integral with or connected to the outer nacelle 238. However, the engine controller 304 can be positioned or connected to any suitable portion or part of the turbofan engine 200.

Figure 5:
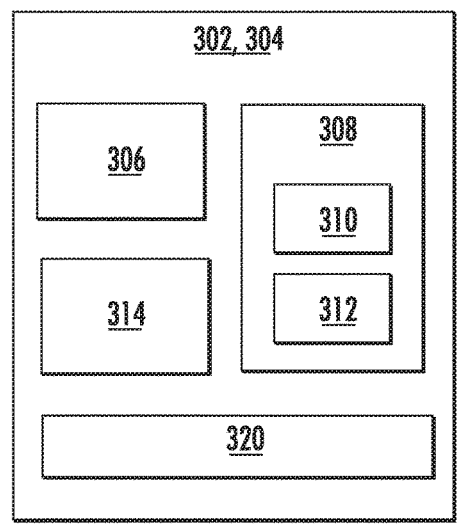
FIG. 5 is a schematic view of a computing device according to various exemplary embodiments of the present disclosure.

FIG. 5 provides an exemplary embodiment of the computing device 302 of FIG. 3. As shown, the engine controllers 304 of each of the turbofan engines 200, or more broadly the computing devices 302, can include one or more processor(s) 306 and one or more memory device(s) 308. The one or more processor(s) 306 can include any suitable processing device, such as a microprocessor, microcontroller, integrated circuit, logic device, and/or other suitable processing device. The one or more memory device(s) 308 can include one or more computer-readable media, including, but not limited to, non-transitory computer-readable media, RAM, ROM, hard drives, flash drives, and/or other memory devices.

The one or more memory device(s) 308 can store information accessible by the one or more processor(s) 306, including computer-readable instructions 310 that can be executed by the one or more processor(s) 306. The instructions 310 can be any set of instructions that when executed by the one or more processor(s) 306, cause the one or more processor(s) 306 to perform operations. In some embodiments, the instructions 310 can be executed by the one or more processor(s) 306 to cause the one or more processor(s) 306 to perform operations, such as any of the operations and functions for which the computing devices 302 are configured, such as the operations for estimating health of a gas turbine engine (or other prime mover) and/or one or more electrical machines embedded therein or operatively coupled with the gas turbine engine (e.g., methods (500), (600)), as described herein. The instructions 310 can be software written in any suitable programming language or can be implemented in hardware. Additionally, and/or alternatively, the instructions 310 can be executed in logically and/or virtually separate threads on processor(s) 306.

The memory device(s) 308 can further store data 312 that can be accessed by the one or more processor(s) 306. For example, the data 312 can include models, formulas, flight history, lifing models, deterioration models, etc. that can be used to calculate engine and/or electrical machine health. The data 312 can also include other data sets, parameters, outputs, information, etc. shown and/or described herein.

The computing device(s) 302 also includes a communication interface 314 used to communicate, for example, with the other components of the aircraft 10. The communication interface 314 can include any suitable components for interfacing with one or more network(s) or electronic components, including for example, transmitters, receivers, ports, controllers, antennas, and/or other suitable components. Communication interface 314 can be used to communicate with other electronic devices over one or more networks, such as e.g., a local area network (LAN), a wide area network (WAN), SATCOM network, VHF network, a HF network, a Wi-Fi network, a WiMAX network, a gatelink network, and/or any other suitable communications network for transmitting messages to and/or from the aircraft 200 or within the aircraft 10, such as from one engine controller 304 to the other or to another computing device 302. Communication interface 314 can communicate over one or more networks using a wide variety of communication protocols. The communication interface 314 can include a data bus or a combination of wired and/or wireless communication links that communicatively couple the computing device 302 with other electronic devices.

As further shown in FIG. 5, at least one of the computing devices 302 of the health monitoring system 300 includes a health monitoring model 320 for outputting one or more health estimates of the turbofan engine 200 and/or the electrical machines 246 embedded therein or coupled thereto. The health monitoring model 320 can include trending, prediction, and/or prognostication logic for assessing and monitoring engine health, electrical machine health, and/or the health of one or more components thereof.

Returning to FIG. 3, as further depicted in the illustrated embodiment, the health monitoring system 300 includes various sensors positioned within or along the turbofan engine 200. In particular, for this embodiment, the health monitoring system 300 includes electrical machine sensors 330, and in particular, the health monitoring system 300 includes a first electrical machine sensor 331 positioned integral with or proximate to the first electrical machine 247 and a second electrical machine sensor 332 positioned integral with or proximate to the second electrical machine 249. The health monitoring system 300 also includes a fuel sensor 333 positioned within the combustion section 214 of the turbofan engine 200, an LP sensor 334 positioned integral with or proximate to the LP shaft 224, and an HP sensor 335 positioned integral with or proximate to the HP shaft 222. The various sensors can be used to sense, measure, or otherwise collect operating parameters of the electrical machines 246 and/or the turbofan engine 200 during operation. Further, as shown, the computing device 302 is communicatively coupled with each of the sensors. In this way, the sensors can send and the computing device 302 can receive or otherwise obtain one or more signals indicative of one or more operating parameters of the turbofan engine 200 and/or the electrical machine 246. Moreover, in some embodiments, the computing device 302 can send and the sensors can receive or otherwise obtain one or more signals from the computing device 302. In this way, the computing device 302 and the sensors are communicatively coupled. The computing device 302 and the sensors can be communicatively coupled in any suitable manner, such as e.g., by any suitable wired or wireless connections. It will be appreciated that the health monitoring system 300 can include other suitable sensors for measuring or sensing various operating parameters of the turbofan engine 200 during operation. It will further be appreciated that health monitoring system 300 need not include all of the named sensors; rather health monitoring system 300 can include any suitable combination of sensors.

Returning to FIG. 4, as shown for this embodiment, the first electrical machine sensor 331 is positioned integral with or proximate to the first electrical machine 247 and the LP sensor 334 is positioned integral with or proximate to the LP shaft 224. As further shown, the computing device 302 is communicatively coupled with the first electrical machine sensor 331 and the LP sensor 334 such that the computing device 302 can receive one or more signals or communications from the first electrical machine sensor 331 and the LP sensor 334 as noted above. The first electrical machine sensor 331 can sense or measure the current, voltage, torque output, power output, or other parameters indicative of the power output of the first electrical machine 247, as well as other operating parameters. Moreover, in a similar manner, although not shown in FIG. 4, the second electrical machine sensor 332 can sense or measure the current, voltage, torque output, power output, or other parameters indicative of the power output of the second electrical machine 249, as well as other operating parameters. In addition, as shown in FIG. 4, the LP sensor 334 can be used to measure or sense the rotational speed of the LP shaft 224. Likewise, although not shown in FIG. 4, the HP sensor 335 positioned integral with or proximate to the HP shaft 222 can be used to measure or sense the rotational speed of the HP shaft 222.

As further shown in FIG. 4, a power source 338 can be in electrical communication with the first electrical machine 247. For this embodiment, the power source 338 is a capacitor (e.g., a film foil capacitor); however, the power source 338 can be any suitable power source capable of applying an increased load on the first electrical machine 247 (or the second electrical machine 249 in some embodiments). That is, the power source 338 can be any suitable power source capable of inducing a change in torque on the first electrical machine 247. When the first electrical machine 247 is or functions as an electrical generator, a change in torque is a change in countertorque, or a torque that opposes the rotation of the rotor 248 and LP shaft 224. The increased load or change in torque on the first electrical machine 247 can be achieved by any suitable means. For example, an injection of current through or voltage across the first electrical machine 247 can induce a change in torque (i.e., countertorque) on the first electrical machine 247. In some embodiments, the power source 338 can be configured to pulse the first electrical machine 247 at certain intervals or upon request (e.g., by a pilot). The pulse can be, for example, any suitable type of intensity increase to the current through or voltage across the first electrical machine 247. In some embodiments, the pulse can be a step pulse. In other embodiments, the pulse can take other forms, such as a gradual pulse that builds in intensity over time or a sinusoidal pulse, for example.

As further shown in FIG. 4, the computing device 302 is communicatively coupled with the power source 338 such that the computing device 302 can send one or more signals to the power source 338 to instruct the power source 338 to pulse the first electrical machine 247 for a predetermined time, such as e.g., five (5) seconds, thirty (30) seconds, two (2) minutes, etc. Although not shown in FIG. 4, the power source 338 can be in electrical communication with the second electrical machine 249 in the same or similar fashion as described with regard to the first electrical machine 247. Moreover, the second electrical machine 249 can be pulsed in the same or similar manner as that described with regard to the first electrical machine 247.

Figure 6:
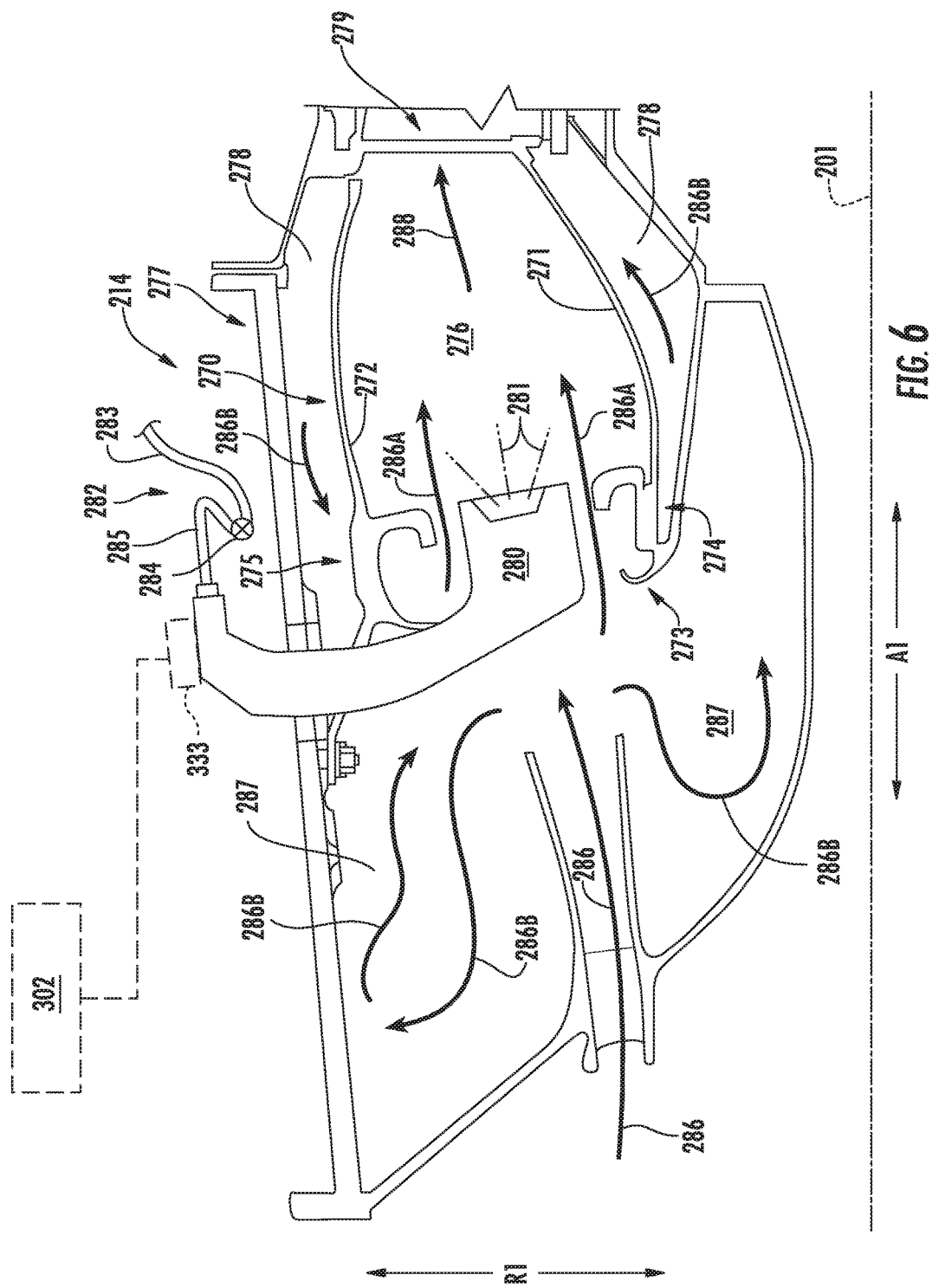
FIG. 6 is a schematic, cross-sectional view of the combustion section of the gas turbine engine of FIG. 3.

Referring now to FIG. 6, the fuel sensor 333 positioned within or along the combustion section 214 of the turbofan engine 200 will now be described in further detail. FIG. 6 provides a cross-sectional, side view of the combustion section 214 of the turbofan engine 200 of FIG. 3. As shown in FIG. 6, the combustion section 214 includes an annular combustor 270 having an annular inner liner 271, an annular outer liner 272 and a generally domed end 273 that extends radially between upstream ends 274, 275 of the inner liner 271 and the outer liner 272, respectively. However, in some embodiments, the combustion section 214 may instead include a cannular type combustor, a can type combustor, or any other suitable combustor.

As shown in FIG. 6, the inner liner 271 is radially spaced from the outer liner 272 with respect to axial centerline 201 and defines a generally annular combustion chamber 276 therebetween. In particular embodiments, the inner liner 271 and/or the outer liner 272 may be at least partially or entirely formed from metal alloys or ceramic matrix composite (CMC) materials. As further shown in FIG. 6, the inner liner 271 and the outer liner 272 are encased within a combustor or outer casing 277. An outer flow passage 278 is defined around the inner liner 271 and/or the outer liner 272. The inner liner 271 and the outer liner 272 extend from the domed end 273 towards a turbine nozzle or inlet 279 to the HP turbine 216 (FIG. 3) thus at least partially defining a hot gas path between the combustor 270 and the HP turbine 216.

For the embodiment depicted in FIG. 6, a fuel nozzle 280 is provided extending through the outer casing 277 and at least partially through the domed end 273 to the combustion chamber 276. The fuel nozzle 280 provides a fuel (or a fuel/air mixture) 281 to the combustion chamber 276. It should be appreciated that, although not depicted, the combustion section 214 includes a plurality of fuel nozzles 280 spaced generally along the circumferential direction C1 of the turbofan engine 200 (i.e., a direction extending about the axial direction A; not shown).

The combustion section 214 additionally includes a fuel delivery system 282. The fuel delivery system 282 generally includes a feed tube 283 fluidly connected to, e.g., one or more fuel pumps, fuel metering valves, fuel tanks, etc. Further, the fuel delivery system 282 includes a fuel manifold 284 fluidly connected to the feed tube 283 for receiving fuel from the feed tube 283, and a pigtail fuel line 285 fluidly connected to the fuel manifold 284 and configured to fluidly connect to one of the fuel nozzles of the plurality of fuel nozzles 280. More specifically, although not depicted, the fuel delivery system 282 includes a plurality of pigtail fuel lines 285 spaced along the circumferential direction C1, each pigtail fuel line 285 extending between and fluidly connecting the fuel manifold 284 to a respective fuel nozzle 280 of the plurality of fuel nozzles 280.

Referring still to FIG. 6, as shown, the combustion section 214 is configured to receive compressed air 286 from a compressor section of the gas turbine engine. The compressed air 286 enters the combustion section 214 through a diffuser cavity 287 of the combustion section 214, where the compressed air 286 is further pressurized. A first portion of the compressed air 286, as indicated schematically by arrows 286A, flows from the diffuser cavity 287 into the combustion chamber 276 where it is mixed with the fuel 281 and burned, thus generating combustion gases 288 within the combustor 270. In certain embodiments, more compressed air is provided to the diffuser cavity 287 than is needed for combustion. Therefore, a second portion of the compressed air 286 as indicated schematically by arrows 286B may be used for various purposes other than combustion. For example, as shown in FIG. 6, compressed air 286B may be routed into one or more flow passages 278 to provide cooling to the inner and outer liners 271, 272.

As shown further in FIG. 6, the fuel sensor 333 is positioned within the combustion section 214 of the turbofan engine 200. More particularly, for this embodiment, the fuel sensor 333 is positioned proximate the fuel nozzle 280. However, in other exemplary embodiments, the fuel sensor 333 can be positioned along the fuel delivery system 282 at any suitable point, such as e.g., along the pigtail fuel line 285. The fuel sensor 333 is configured to measure or sense the fuel flow through the combustion section 214, and more particularly, the fuel sensor 333 can measure or sense the fuel flow through the fuel delivery system 282. The fuel sensor 333 can be configured to measure or sense the change in fuel flow over time. As further shown in FIG. 6, the computing device 302 is communicatively coupled with the fuel sensor 333. As noted above, this allows the fuel sensor 333 to send one or more communications or signals to the computing device 302 indicative of the fuel flow through the combustion section 214. Moreover, the computing device 302 can send one or more communications to the fuel sensor 333.

Returning to FIG. 3, for this embodiment, the turbofan engine 200 also includes one or more gas-path sensors 336 that are used to measure temperature, pressure, and/or other operating parameters of the turbofan engine 200 during operation. By way of example, as shown in the illustrated embodiment of FIG. 3, the turbofan engine 200 includes a thermocouple gas-path sensor 336 positioned downstream of the HP turbine 216 and upstream of the LP turbine 218 for measuring temperature (i.e., a temperature at station 45). Although only one gas-path sensor 336 is shown in FIG. 3, it will be appreciated that the turbofan engine 200 can include other suitable gas-path sensors 336 as well, such as e.g., a sensor positioned at the inlet of the combustion section 214, a sensor positioned downstream of the LP compressor 210 and upstream of the HP compressor 212, etc.

As further shown in FIG. 3, the computing device 302 (i.e., engine controller 304) is communicatively coupled with the gas-path sensor 336. In this way, the gas-path sensors 336 can send one or more communications or signals indicative of one or more operating parameters of the turbofan engine 200 during operation and computing device 302 can receive or otherwise obtain the one or more communications or signals. Moreover, the computing device 302 can send and the gas-path sensors 336 can receive one or more signals or communications from the computing device 302.

Figure 7:
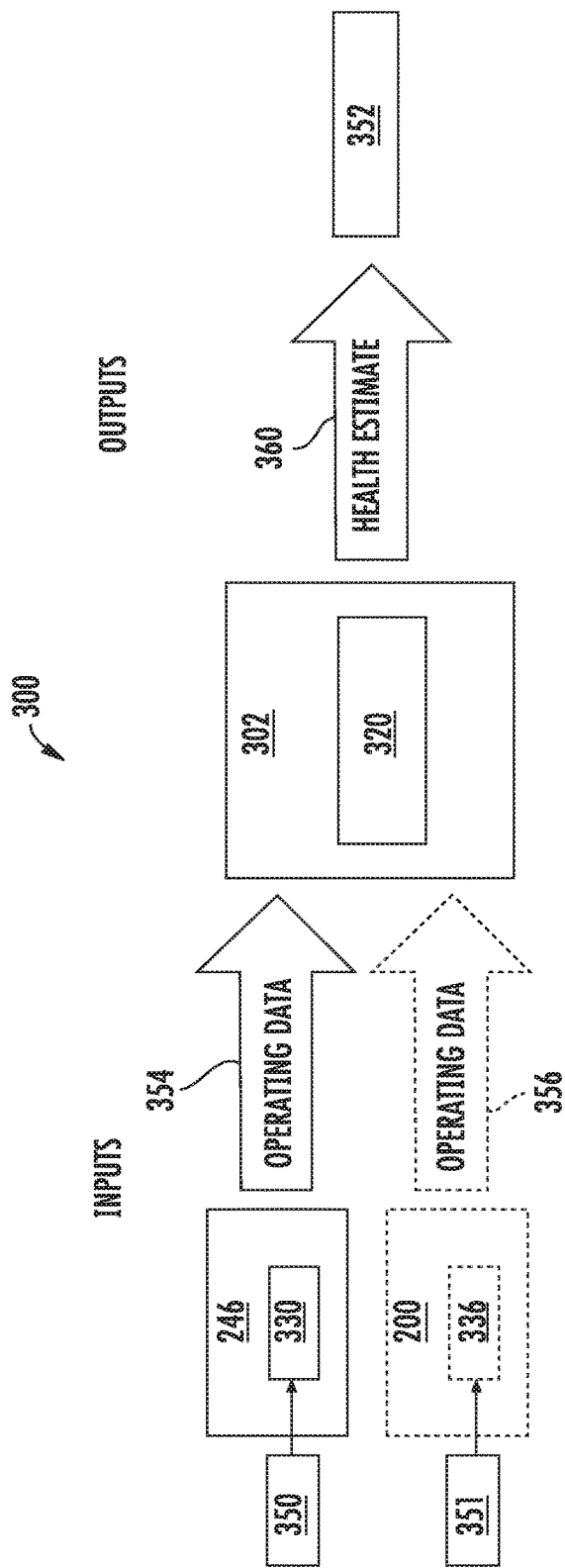
FIG. 7 is a flow diagram according to various exemplary embodiments of the present disclosure.

FIG. 7 provides an exemplary flow chart according to various embodiments of the present disclosure. In particular, FIG. 7 provides an exemplary flow chart for monitoring the health of at least one of a prime mover and an electrical machine coupled with the prime mover, or for this embodiment, the health of at least one of the turbofan engine 200, the electrical machines 246 embedded therein, and/or components thereof. In FIG. 7 and the accompanying text, the electrical machines will be described and depicted using the reference numeral 246 and the electrical machine sensors will be described using reference numeral 330, except as otherwise noted. As will be appreciated, reference numeral 246 can be used to describe the first and/or second electrical machines 247, 249, and reference numeral 330 can be used to describe the first and/or second electrical machine sensors 331, 332.

As shown in FIG. 7, the electrical machine sensor 330 of the electrical machine 246 obtains, senses, measures, or otherwise collects one or more operating parameters 350 of the electrical machine 246 during operation of the turbofan engine 200 and the electrical machine 246 over a predetermined time. By way of example, one of the operating parameters 350 of the electrical machine 246 can be the amount of current flowing through the electrical machine 246 over the predetermined time. Other exemplary operating parameters 350 of the electrical machine 246 can include the voltage across the electrical machine 246, the torque on the electrical machine 246 (i.e., the countertorque that opposes rotation of the shaft in which the electrical machine 246 is coupled), etc.

After the one or more operating parameters 350 of the electrical machine 246 are sensed by the electrical machine sensor 331 over the predetermined time, operating data 354 indicative of the operating parameters 350 of the electrical machine 246 measured over the predetermined time is sent or routed to the computing device 302 of the health monitoring system 300. The computing device 302 obtains the operating data 354. More particularly, the health monitoring model 320 of computing device 302 obtains the operating data 354.

Thereafter, the obtained operating data 354 is normalized. Specifically, the incoming operating data 354 indicative of the operating parameters 350 of the electrical machine 246 is normalized for variation in certain operating conditions, such as e.g., the power settings of the turbofan engine 200, the power extraction levels of the electrical machine 246, etc.

After normalizing the operating data 354, the operating parameters 350 of the electrical machine 246 are trended over time by the health monitoring model 320.

In some embodiments, after normalizing the operating data 354, a parameter function is generated based at least in part on the operating data 354. In such embodiments, the parameter function is indicative of at least one of the operating parameters 350 of the electrical machine 246 trended over time. Based at least in part on the parameter function, a health estimate 360 of at least one of the electrical machine 246 and the turbofan engine 200 (i.e., the prime mover in this embodiment). Any suitable scale or measuring system can be used for communicating the health estimate 360 (e.g., the engine is an 8 out of 10, the electrical machine 246 has an estimated remaining life of one hundred flight hours (100 hours), etc.). After determining the health estimate 360, the health monitoring model 320 of the computing device 302 outputs the health estimate 360. The outputted health estimate 360 can then be communicated to a pilot, aircrew, service crew, and/or a maintenance or service scheduling computing device in real time, or to any other suitable place, device, or person. For this embodiment, as shown in FIG. 7, the health estimate 360 is communicated via a display device 352, such as a multifunctional display positioned within the cockpit of the aircraft 10 of FIGS. 1 and 2.

Figure 8:
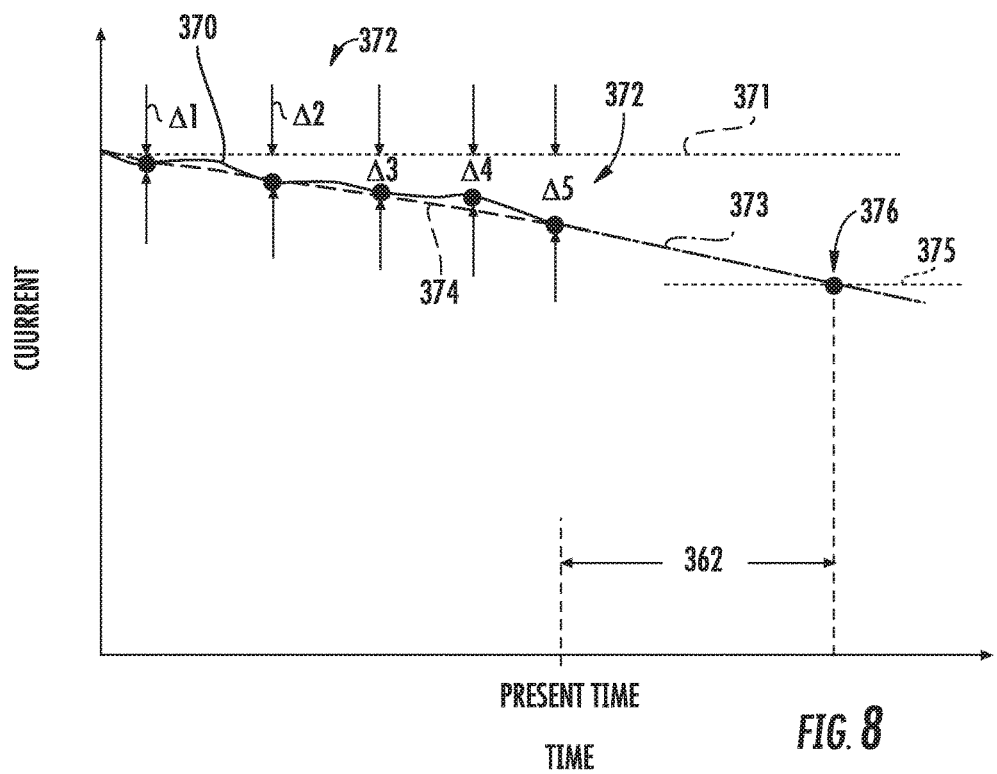
FIG. 8 provides a plot of the current through the electrical machine of FIGS. 3 and 4 as a function of time for a particular power setting and operating range of the gas turbine engine of FIG. 3.

By way of example, FIG. 8 provides an exemplary plot of the current through the electrical machine 246 as a function of time for a particular power setting and operating range of the turbofan engine 200. As shown, the electrical machine sensor 330 has collected data indicative of the current through the electrical machine 246 over a predetermined time and the computing device 302 has obtained the operating data 354 indicative of the operating parameters 350 of the electrical machine 246. As shown in FIG. 8, the current passing through the electrical machine 246 decreases over time due to the deterioration of the turbofan engine 200 and the electrical machine 246. In particular, as the power output of the turbofan engine 200 decreases for a particular power setting, the current flowing through the electrical machine 246 decreases due to the reduced rotational speed of the rotatory member in which the rotor 248 of the electrical machine 246 is connected.

As further shown in FIG. 8, a parameter function 373 is generated based at least in part on the operating data 354. For this example, the parameter function 373 is indicative of at least one of the operating parameters 350 of the electrical machine 246 trended over time, which in this embodiment is the current flowing through the electrical machine 246 over time. The parameter function 373 can be generated by various suitable methods. For instance, in some embodiments, the parameter function 373 can be generated by a best fit line 374 fit over the data points of the operating parameter 350 of the electrical machine 246 prior to the present time as shown in FIG. 8. In some embodiments, based at least in part on the best fit line 374, the health monitoring model 320 can prognosticate the current passing through the electrical machine 246 over time such that a parameter function 373 can be generated. In yet other embodiments, the rate of change over time between a present profile 370 and a baseline profile 371 can be determined, and based on this rate of change, the health monitoring model 320 can prognosticate the current passing through the electrical machine 246 over time such that a parameter function 373 can be generated. More particularly, as shown in FIG. 8, a delta 372 between the present profile 370 and the baseline profile 371 can be determined at certain intervals such that a series of deltas between the present and baseline profiles 370, 371 can be determined (i.e., $\Delta_1$, $\Delta_2$, $\Delta_3$, $\Delta_4$, and $\Delta_5$). The baseline profile 371 is indicative of the amount of current that passed through the electrical machine 246 when the turbofan engine 200 and electrical machine 246 were "new makes" having no or negligible deterioration. In some embodiments, the baseline profile 371 can be based on analytics, or the amount of current that "should" be passed through the electrical machine 246 when the electrical machine 246 is a new make. Once the deltas 372 are determined, a rate of change over time between a present profile 370 and a baseline profile 371 can be determined, and based on the rate of change; the parameter function 373 can be determined by the health monitoring model 320 of the computing device 302. Based at least in part on the parameter function 373, a health estimate 360 of at least one of the electrical machine 246 and the turbofan engine 200

In some embodiments, after normalizing the operating data 354, a parameter function is generated based at least in part on the operating data 354. In such embodiments, the parameter function is indicative of at least one of the operating parameters 350 of the electrical machine 246 trended over time. In such embodiments, the operating parameter upon which the parameter function is based defines a predetermined threshold indicative of a value in which the electrical machine is no longer able to supply a predetermined power output to a load connected thereto, such as a BLI fan 106. In such embodiments, the health estimate is indicative of a useful life remaining of at least one of the prime mover and the electrical machine. In such embodiments, the useful life remaining is determined based at least in part on an intersection of the parameter function and the predetermined threshold.

For example, as shown in FIG. 8, as noted above, the operating parameter 350 measured by the electrical machine sensor 330 is the amount of current passing through the electrical machine 246. It will be appreciated that when the current passing through the electrical machine 246 reaches a certain value (in this embodiment amperes), the electrical machine 246 will no longer be able to supply the required or predetermined power output to a load connected thereto, such as e.g., the BLI fan 106 or other aircraft systems. This amount or value is defined for the particular operating parameter as the predetermined threshold 375. For this embodiment, the useful time remaining 362 is a period of time extending between the present time and an intersection point 376, or a point in time in which the parameter function 373 intersects the predetermined threshold 375.

In some embodiments, after normalizing the operating data 354, a parameter function is generated based at least in part on the operating data 354 obtained from the electrical machine sensor 330 of the electrical machine 246. In such embodiments, the parameter function is indicative of at least one of the operating parameters 350 of the electrical machine 246 trended over time. Moreover, as shown in FIG. 7, operating data 356 indicative of one or more operating parameters 351 of the turbofan engine 200 measured over the predetermined time during operation of the turbofan engine 200 and the electrical machine 246 is obtained. This operating data 356 can also be normalized in the same fashion as the operating data 354 for the electrical machine 246. A second parameter function is then generated based at least in part on the operating data 356 obtained from the turbofan engine 200. In such embodiments, the second parameter function is indicative of at least one of the operating parameters 351 of the turbofan engine 200 trended over time. Further, in such embodiments, when determining the health estimate 360, the health estimate 360 is determined based at least in part on the parameter function of the electrical machine 246 and the parameter function of the turbofan engine 200. In this way, data extracted from the electrical machine 246 can be used to augment the data extracted from the turbofan engine 200 to improve engine health assessments. In addition, data extracted from the turbofan engine 200 can be used to augment the data extracted from the electrical machine 246 to improve electrical health assessments. Moreover, data extracted from the electrical machine 246 and data extracted from the turbofan engine 200 can be used to improve component health assessments of both the electrical machine 246 and the turbofan engine 200.

Figure 9:
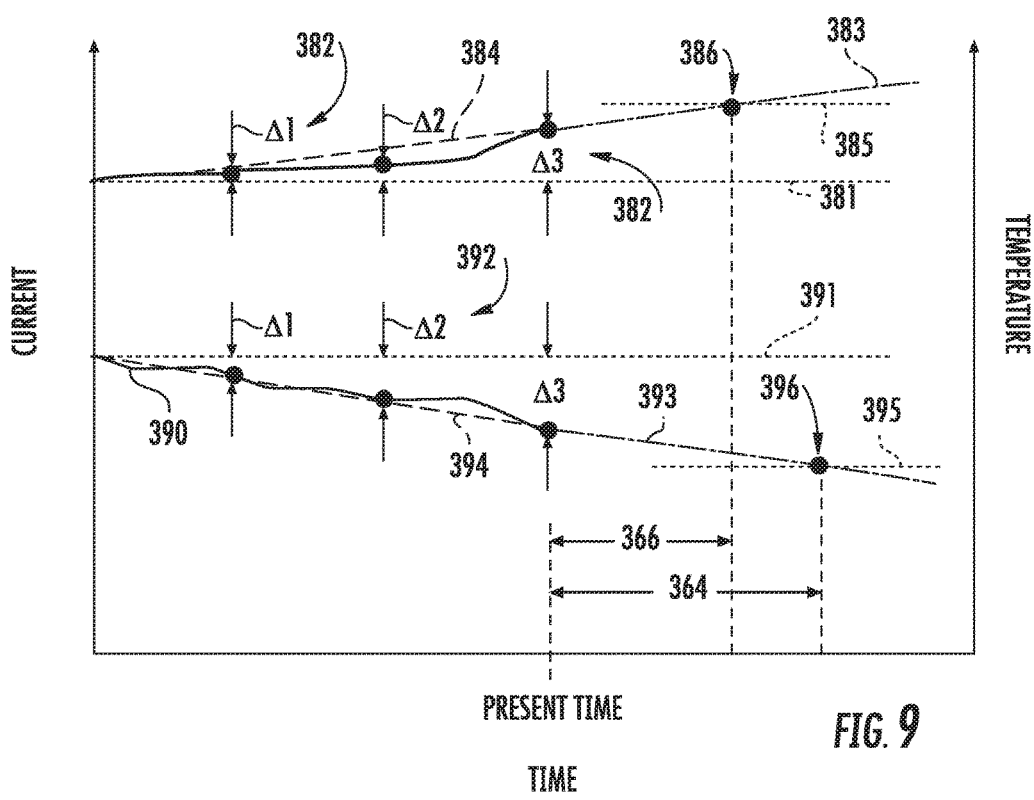
FIG. 9 provides a plot of the current through the electrical machine of FIGS. 3 and 4 as a function of time and the temperature along a core air flowpath of the gas turbine engine of FIG. 3 as a function of time for a particular power setting and operating range of the gas turbine engine.

By way of example, FIG. 9 provides a plot of the current through the electrical machine 246 as a function of time and the T45 temperature (i.e., the temperature along the core air flowpath 221 between the HP turbine 216 and the LP turbine 218) of the turbofan engine 200 as a function of time for a particular power setting and operating range of the turbofan engine 200. As shown, the electrical machine sensor 330 has collected data indicative of the current through the electrical machine 246 over time and the gas-path sensor 336 has collected temperature data of the turbofan engine 200 over time. As the turbofan engine 200 and electrical machine 246 deteriorate over time, the current passing through the electrical machine 246 decreases as the power output of the turbofan engine 200 decreases for a particular power setting of the engine. Moreover, as the turbofan engine 200 deteriorates over time, the temperature at T45 becomes warmer and warmer over time to achieve a particular power setting.

As further shown in FIG. 9, a parameter function 393 is generated based at least in part on the operating data 354 obtained by the computing device 302. For this example, the parameter function 393 is indicative of at least one of the operating parameters 350 of the electrical machine 246 trended over time, which in this embodiment is the current flowing through the electrical machine 246. The parameter function 393 can be generated by various suitable methods, such as the methods noted above with regard to the parameter function 373. For instance, in some embodiments, the parameter function 393 can be generated by a best fit line 394 fit over the data points of the operating parameter 350 of the electrical machine 246 prior to the present time as shown in FIG. 9. In some embodiments, based at least in part on the best fit line 394, the health monitoring model 320 can prognosticate the current passing through the electrical machine 246 over time such that a parameter function 393 can be generated. In yet other embodiments, the rate of change over time between a present profile 390 and a baseline profile 391 can be determined, and based on this rate of change, the health monitoring model 320 can prognosticate the current passing through the electrical machine 246 over time such that a parameter function 393 can be generated. More particularly, as shown in FIG. 9, a delta 392 between the present profile 390 and the baseline profile 391 can be determined at certain intervals such that a series of deltas between the present and baseline profiles 390, 391 can be determined. The baseline profile 391 is indicative of the amount of current that passed through the electrical machine 246 when the turbofan engine 200 and electrical machine 246 were "new makes" having no or negligible deterioration. In some embodiments, the baseline profile 391 can be based on analytics, or the amount of current that "should" be passed through the electrical machine 246 when the electrical machine 246 is a new make. Once the deltas 392 are determined, a rate of change over time between a present profile 390 and a baseline profile 391 can be determined, and based on the rate of change; the parameter function 393 can be determined by the health monitoring model 320 of the computing device 302.

As further shown in FIG. 9, a parameter function 383 is generated based at least in part on the operating data 356 obtained by the computing device 302. For this example, the parameter function 383 is indicative of at least one of the operating parameters 351 of the turbofan engine 200 trended over time, which in this embodiment is the temperature within the core air flowpath 221 at station T45. The parameter function 383 can be generated by various suitable methods, such as the methods noted above with regard to the parameter functions 373, 393. For instance, in some embodiments, the parameter function 383 can be generated by a best fit line 384 fit over the data points of the operating parameter 351 of the turbofan engine 200 prior to the present time as shown in FIG. 9. In some embodiments, based at least in part on the best fit line 384, the health monitoring model 320 can prognosticate the temperature at T45 over time such that a parameter function 383 can be generated. In yet other embodiments, the rate of change over time between a present profile 380 and a baseline profile 381 can be determined, and based on this rate of change, the health monitoring model 320 can prognosticate t the temperature at T45 over time such that a parameter function 383 can be generated. More particularly, as shown in FIG. 9, a delta 382 between the present profile 380 and the baseline profile 381 can be determined at certain intervals such that a series of deltas between the present and baseline profiles 380, 381 can be determined. The baseline profile 381 is indicative of the temperature at T45 when the turbofan engine 200 and electrical machine 246 were "new makes" having no or negligible deterioration. In some embodiments, the baseline profile 381 can be based on analytics. Once the deltas 382 are determined, a rate of change over time between a present profile 380 and a baseline profile 381 can be determined, and based on the rate of change, the parameter function 383 can be determined by the health monitoring model 320 of the computing device 302. It will be appreciated that the present profile 380 and baseline profile 381 are dependent upon the operating parameters 351 of the turbofan engine 200 that were sensed. For example, if the gas-path sensor 336 is configured to measure or sense the pressure of the air along the core air flowpath 221 at station P3 (i.e., the pressure of the air discharged from the HP compressor 212), the present profile 380 would be indicative of the pressure within the core air flowpath 221 at P3 and the baseline profile 381 would be indicative of the pressure within the core air flowpath 221 at P3 when the turbofan engine 200 and electrical machine 246 were "new makes" having no or negligible deterioration.

Once the parameter function 393 indicative of at least one of the operating parameters 350 of the electrical machine 246 trended over time and the parameter function 383 indicative of at least one of the operating parameters 351 of the turbofan engine 200 trended over time are generated, the parameter function 393 of the electrical machine 246 can be used in conjunction with or to augment the data extracted from the turbofan engine 200 to improve engine health assessments. In addition, the parameter function 383 of the turbofan engine 200 can be used to augment the data extracted from the electrical machine 246 to improve electrical machine health assessments. Moreover, data extracted from the electrical machine 246 and data extracted from the turbofan engine 200 can be used to improve component health assessments of both the electrical machine 246 and the turbofan engine 200. For instance, the parameter functions 383, 393 can be compared over time and can offer insight into the health of the electrical machine 246, the turbofan engine 200, and/or one or more components of the electrical machine 246 and/or the turbofan engine 200. Insight into how the electrical machine 246 is performing over time in relation to the turbofan engine 200 can offer improved engine health assessments of the engine, the electrical machine, and the components thereof.

Additionally, returning to FIG. 9, in some embodiments, the health estimate 360 can be an estimated useful life remaining of the turbofan engine 200, the electrical machine 246, and/or one or more components of the turbofan engine 200 and/or the electrical machine 246. Based on the generated parameter function 393 of the electrical machine 246, which for this embodiment is the amount of current passing through the electrical machine 246 over time, and the generated parameter function 383 of the turbofan engine 200, which for this embodiment is the temperature at T45 of the turbofan engine 200 over time, the health monitoring model 320 can determine a useful life remaining of the turbofan engine 200, the electrical machine 246, and/or one or more components of the turbofan engine 200 and/or the electrical machine 246.

By way of example, as shown in FIG. 9, the useful time remaining 364 for the electrical machine 246 is a period of time extending between the present time and a point in time in which the parameter function 393 intersects a predetermined threshold 395 at an intersection point 396. For example, the predetermined threshold 385 can be set to a value in which the electrical machine 246 will no longer be able to supply the required or predetermined power output to a load connected thereto. This amount or value is defined for the particular operating parameter as the predetermined threshold 395. Moreover, the useful engine time remaining 366 for the turbofan engine 200 is a period of time extending between the present time and a point in time in which the parameter function 383 intersects a predetermined threshold 385 at an intersection point 386. For example, the predetermined threshold 385 can be a value (in this embodiment a temperature at T45) in which the turbine rotor blades or stator vanes of the HP or LP turbines 216, 218 start to fail catastrophically. By utilizing the parameter functions 393, 383 and knowing the predetermined thresholds 395, 385, the useful life remaining of the electrical machine 246 and/or the turbofan engine 200 can be determined.

Moreover, as shown further in FIG. 9, where the parameter functions 383, 393 are prognosticated or trended over time, the servicing of the turbofan engine 200 and/or the electrical machine 246 can be better scheduled and the time on wing (TOW) limiter can be determined. For example, in the embodiment of FIG. 9, the turbofan engine 200 is the TOW limiter as its useful life remaining 366 is shorter in time than the useful life remaining 364 of the electrical machine 246. Moreover, in instances where the remaining useful lives 364, 366 are relatively close in time to one another, instead servicing the turbofan engine 200 when its useful life has expired and then servicing the electrical machine 246 when its useful life has expired, the determined useful life remaining 364, 366 of the electrical machine 246 and the turbofan engine 200 can aid in an analysis to determine whether it is more beneficial to service the electrical machine 246 along with the turbofan engine 200 or to service them separately as their useful lives expire.

In some embodiments, particularly where a gas turbine engine or prime mover includes more than one electrical machines embedded therein or coupled thereto, it will be appreciated that one or more operating parameters of the additional electrical machines can be measured during operation of the prime mover (e.g., gas turbine engine) over a predetermined time. Operating data indicative of the sensed operating parameters can be obtained by a computing device of the health monitoring system. Thereafter, a parameter function can be generated based at least in part on the operating data, such as e.g., using a best fit line or a rate of change of the present profile compared to the baseline profile over time. Once the parameter function is generated, a health estimate can be determined.

Figure 10:
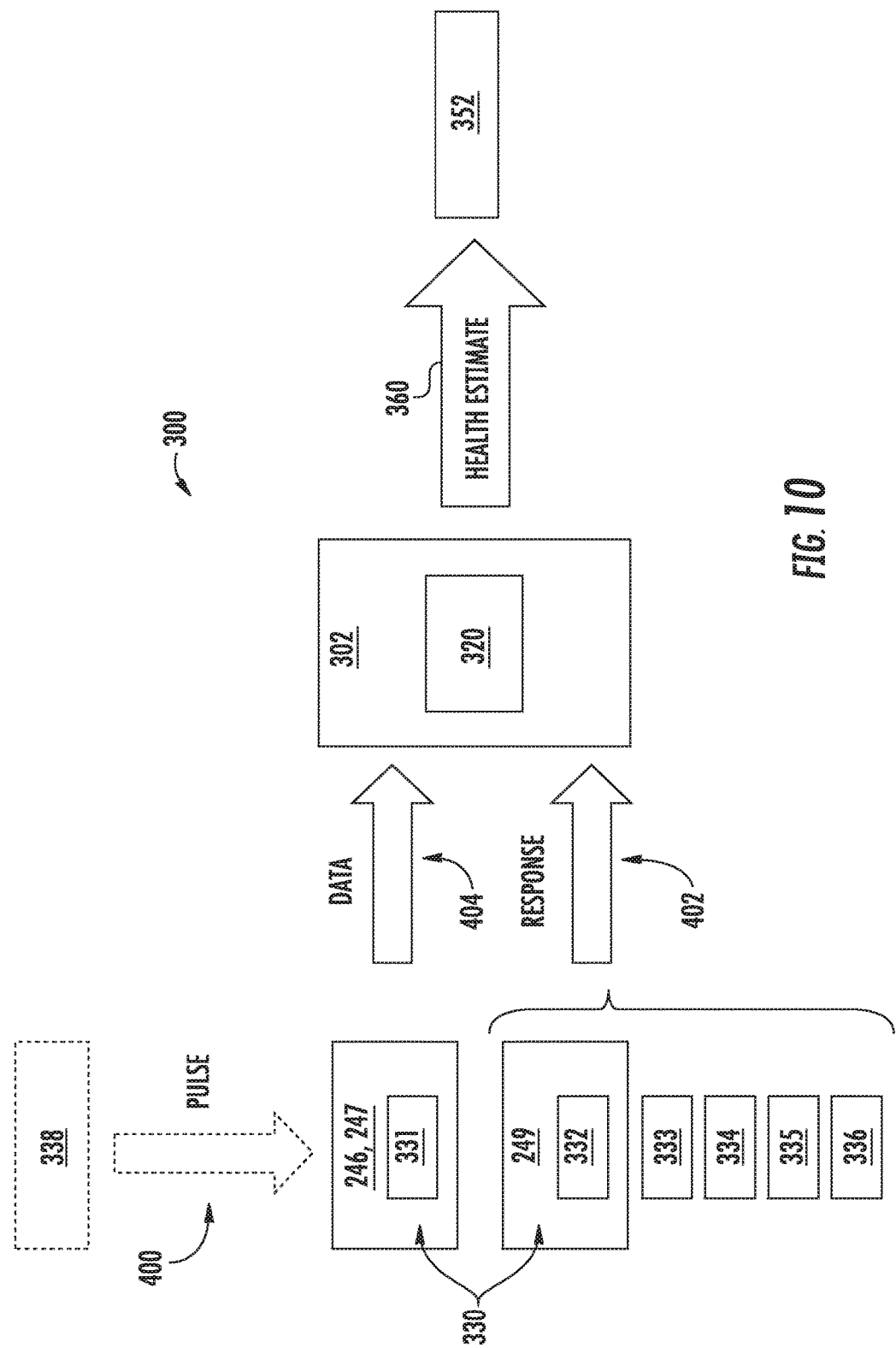
FIG. 10 is a flow diagram according to various exemplary embodiments of the present disclosure.

FIG. 10 provides a flow diagram according to various exemplary embodiments of the present disclosure. In particular, the flow diagram of FIG. 10 provides exemplary embodiments of various processes for determining the health of the turbofan engine 200, the electrical machines 246, and or one or more components thereof.

As shown in FIG. 10, in some exemplary embodiments of the present disclosure, increased loads can be intentionally or purposefully placed on the electrical machine 246 such that a response to the increased load can be measured. Stated alternatively, the electrical machine 246 can be pulsed for a predetermined time to induce a change in torque (i.e., the countertorque when the electrical machine 246 is or is functioning an electric generator) on the electrical machine 246, and a response to the pulse can be measured. The measured response can then be utilized to predict or estimate engine health and/or electrical machine health. Moreover, while being pulsed or thereafter, data from the electrical machine 246 can be communicated to the computing device 302, such as e.g., the actual torque (i.e., countertorque) exerted on the electrical machine 246 when pulsed, the amount of current that actually flowed through the electrical machine 246, the voltage across the electrical machine 246 while being pulsed and the voltage response to the pulse after the pulse, etc. This data 404 can be used to qualify a particular response 402 and can provide better data analytics for analyzing the response 402 to the pulse 400.

At a predetermined interval or upon request, the electrical machine 246 is first pulsed, denoted by the arrow 400, by the power source 338 to initialize the process as shown in FIG. 10. The electrical machine 246 is pulsed for a predetermined time to induce a change in torque on the electrical machine 246. The pulse or increased load on the electrical machine 246 (i.e., the pulse) can be achieved by any suitable means. For example, an injection of current intensity through or an increase in voltage across the electrical machine 246 can pulse the electrical machine 246.

A response, denoted by the arrow 402, to the pulse (i.e., the change in torque on the electrical machine 246) is then measured. In some embodiments, the response 402 is a change in one or more operating parameters 351 of the turbofan engine 200 (i.e., the prime mover) over time. More particularly, in some embodiments, the change in the one or more operating parameters 351 is indicative of a change in a power output of the turbofan engine 200 over time, which is the prime mover in this embodiment. Additionally or alternatively, in some embodiments, the response 402 is a change in one or more operating parameters 350 of another electrical machine embedded or coupled to the turbofan engine 200 over time. For example, as depicted in FIG. 10, when the first electrical machine 247 is pulsed, the second electrical machine sensor 332 of the second electrical machine 249 can measure a change in the power output of the second electrical machine 249.

After the response 402 to the pulse 400 of the electrical machine 246 is measured, the response 402 can be utilized to determine the health estimate 360 of the turbofan engine 200 (i.e., prime mover) based at least in part on the response 402. In some embodiments, as will be explained more fully below, the health estimate 360 is determined by comparing the response 402 to a baseline response and then determining a delta between the response 402 and the baseline response, and based at least in part on the delta between the response 402 and the baseline response, the health estimate 360 can be determined as explained more fully below.

By way of example, with reference to FIG. 10, the electrical machine 246 is first pulsed 400 by the power source 338 for a predetermined time to induce a torque on the electrical machine 246. In this way, the input is dTorque/dt. In response, in this example, the fuel sensor 333 measures the response 402 to the pulse 400. The response 402 is indicative of a change in one or more operating parameters 351 of the turbofan engine 200 over time. In particular, for this embodiment, the fuel sensor 333 measures a response that is indicative of a change in fuel flow over time. Thus, the response is dFuel/dt. In this way, the fuel sensor 333 measures a fuel flow response when the electrical machine 246 is pulsed. After the response 402 to the pulse of the electrical machine 246 is measured, the response 402 is utilized to determine the health estimate 360 of the turbofan engine 200 (i.e., the prime mover).

Figure 11:
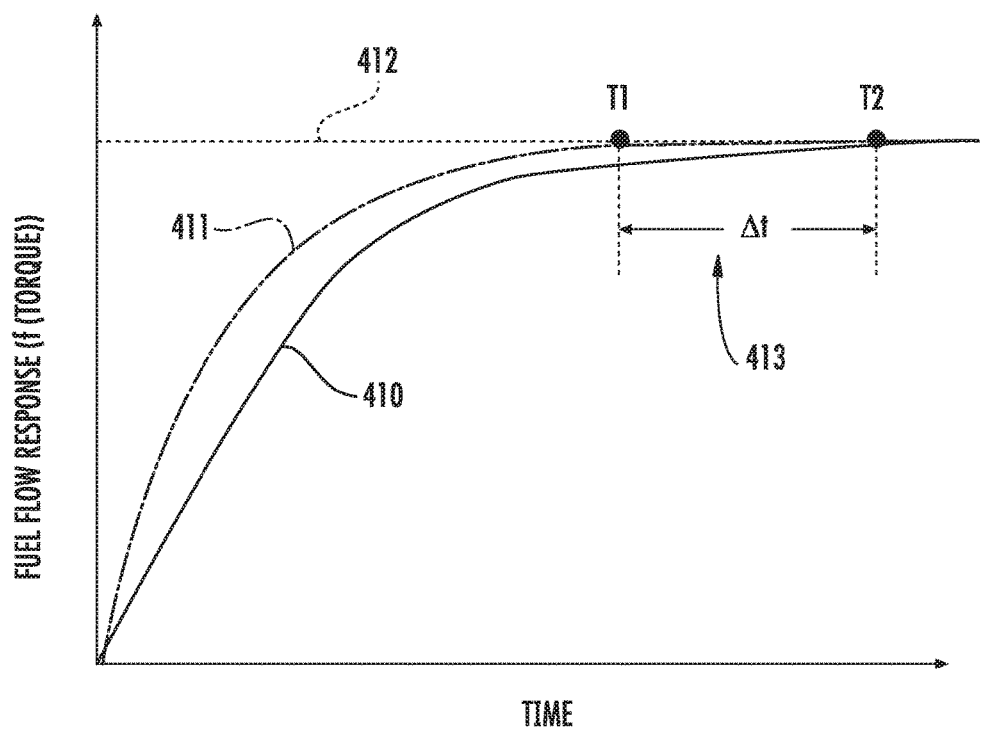
FIG. 11 provides a plot of a fuel flow response as a function of time according to an exemplary embodiment of the present disclosure.

As shown in FIG. 11 and continuing with the example above, FIG. 11 provides an exemplary plot of a fuel flow response 410 as a function of time. For this embodiment, the fuel flow response 410 is a function of torque on the electrical machine 246. Further, for this embodiment, the fuel flow response 410 is for a turbofan engine that has some degree of non-negligible deterioration. As shown, when the electrical machine 246 is pulsed, the fuel flow through the fuel delivery system 282 increases the fuel flow into the combustor 270 to account for the loss in power output (or perceived loss) of the turbofan engine 200 due to the increased load placed on the electrical machine 246 (i.e., the increased torque opposing rotation of the rotatory member of the turbofan engine 200 in which the electrical machine 236 is coupled). Once the turbofan engine 200 reaches its desired power output, the fuel flow response 410 reaches steady state, denoted by 412.

As further shown in FIG. 11, a baseline response 411 indicative of the fuel flow response when the turbofan engine 200 was a "new make" having no or negligible deterioration is shown as a function of time. As the engine deteriorates, as will be appreciated, more fuel is required for the turbofan engine 200 to achieve a certain level of power output or a change in power output for a specified operating range. Accordingly, as shown, the baseline response 411 of the "new make" turbofan engine 200 achieved steady state 412 faster than the fuel flow response 410 of the turbofan engine with some degree of non-negligible deterioration. In some embodiments, to determine a health estimate 360 of the turbofan engine 200, the fuel flow response 410 is compared to the baseline response 411. That is, for some embodiments, the point in time in which the fuel flow response 410 reaches steady state 412 is compared to the point in time in which the base line response 411 reaches steady state 412. As shown in FIG. 11, the baseline response 411 reaches steady state 412 at a point in time T1 and the fuel flow response 410 reaches steady state 412 at a point in time T2. A delta 413, or difference between the two points in time T1, T2 is determined. The delta 413 is indicative of some degree of deterioration of the turbofan engine 200. Based at least in part on the delta 413, the health estimate 360 for the turbofan engine 200 can be determined.

As yet another example, with reference again to FIG. 10, the electrical machine 246 is first pulsed 400 for a predetermined time to induce a torque on the electrical machine 246. Thereafter, the LP sensor 334 measures a response 402 to the pulse. The response 402 is indicative of a change in one or more operating parameters 351 of the turbofan engine 200 over time. In particular, for this example, the LP sensor 334 measures a response that is indicative of a change in rotational speed of the LP shaft 224 over time, or $dN1_{speed}/dt$. In this way, the LP sensor 334 measures an N1 speed response when the electrical machine 246 is pulsed. After the response 402 to the pulse 400 is measured, the response 402 is utilized to determine the health estimate 360 of the turbofan engine 200 (i.e., prime mover).

Figure 12:
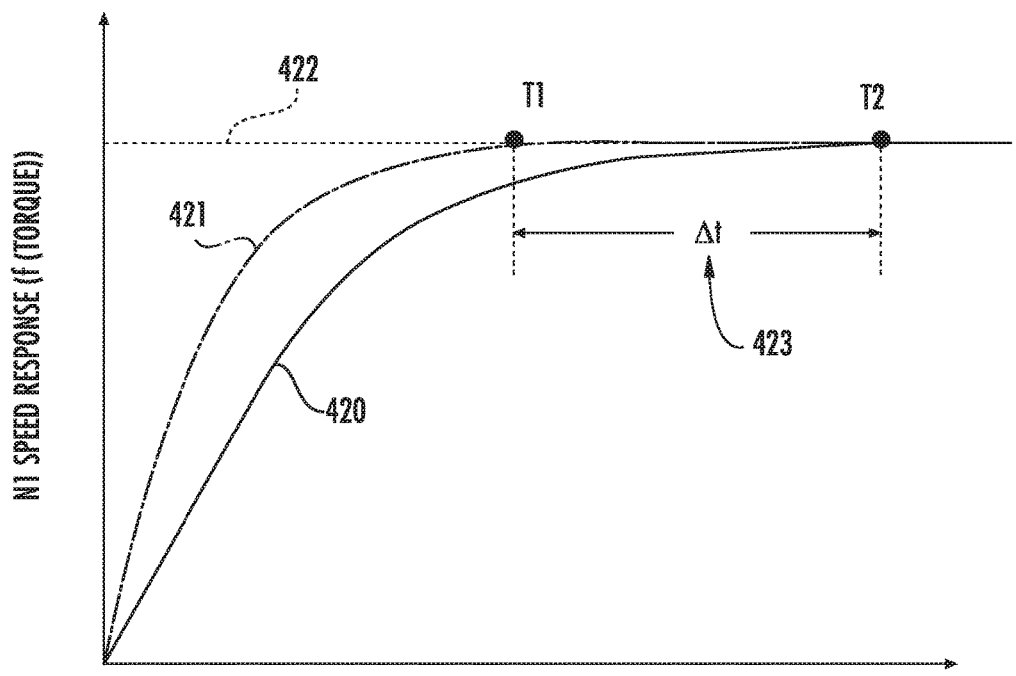
FIG. 12 provides a plot of an low pressure shaft (N1) speed response as a function of time according to an exemplary embodiment of the present disclosure.

As shown in FIG. 12 and continuing with the example above, FIG. 12 provides an exemplary plot of an N1 speed response 420 as a function of time. For this embodiment, the N1 speed response 420 is a function of torque on the electrical machine 246. Further, in this example, the N1 speed response 420 is for a turbofan engine that has some degree of non-negligible deterioration. When the electrical machine 246 is pulsed, the rotational speed of the LP shaft 224 decreases due to the increased load on the electrical machine 246, as noted above. The increased load on the electrical machine 246 induces a countertorque on the electrical machine 246 that opposes the rotation of the LP shaft 224. The reduced LP shaft speed 224 results in a loss or perceived loss of power output of the turbofan engine 200. To account for the loss of power output, the turbofan engine 200 increases its power output (e.g., by increasing the fuel flow into the combustor 270). As the turbofan engine 200 increases its power output, the rotational speed of the LP shaft 224 increases over time, as shown in FIG. 12. When the desired power output is reached, the rotational speed of the LP shaft 224 reaches steady state, denoted by 422.

As further shown in FIG. 12, a baseline response 421 indicative of the N1 speed response when the turbofan engine 200 was a "new make" having no or negligible deterioration is shown as a function of time. As the engine deteriorates, it takes a longer amount of time for the LP shaft 224 to reach a particular rotational speed such that the turbofan engine 200 can achieve a certain level of power output or a change in power output for a specified operating range. Accordingly, as shown, the baseline response 421 of the "new make" turbofan engine 200 achieved steady state 422 faster than the N1 speed response 420 of the turbofan engine with some degree of non-negligible deterioration. In some embodiments, to determine a health estimate 360 of the turbofan engine 200, the N1 speed response 420 is compared to the baseline response 421. That is, for some embodiments, the point in time in which the N1 speed response 420 reaches steady state 422 is compared to the point in time in which the baseline response 421 reaches steady state 422. As shown in FIG. 12, the baseline response 421 reaches steady state 422 at a point in time T1 and the N1 speed response 420 reaches steady state 422 at a point in time T2. A delta 423, or difference between the two points in time T1, T2 is determined. As will be appreciated, the delta 423 is indicative of some degree of deterioration of the turbofan engine 200. Based at least in part on the delta 423, the health estimate 360 for the turbofan engine 200 can be determined.

As will be appreciated, the HP sensor 335 can be utilized to determine an N2 speed response such that the health estimate 360 of the turbofan engine 200 can ultimately be determined in the same or similar manner as noted in the example above with respect to the LP sensor 334.

As a further example, with reference again to FIG. 10, the gas-path sensor 336 can be used to determine the health of the turbofan engine 200 or one or more components thereof. As shown in FIG. 10, the electrical machine 246 is first pulsed 400 for a predetermined time to induce a torque on the electrical machine 246. Thereafter, the gas-path sensor 336 measures a response 402 to the pulse 400. The response 402 is indicative of a change in one or more operating parameters 351 of the turbofan engine 200 over time. In particular, in this example, the gas-path sensor 336 measures a response 402 that is indicative of a change in ttemperature at T45 (i.e., a location downstream of the HP turbine 216 and upstream of the LP turbine 218) over time, or dT45/dt. In this way, the gas-path sensor 336 measures a T45 ttemperature response when the electrical machine 246 is pulsed. After the response 402 to the pulse of the electrical machine 246 is measured, the response 402 is utilized to determine the health estimate 360 of the turbofan engine 200 (i.e., prime mover).

Figure 13:
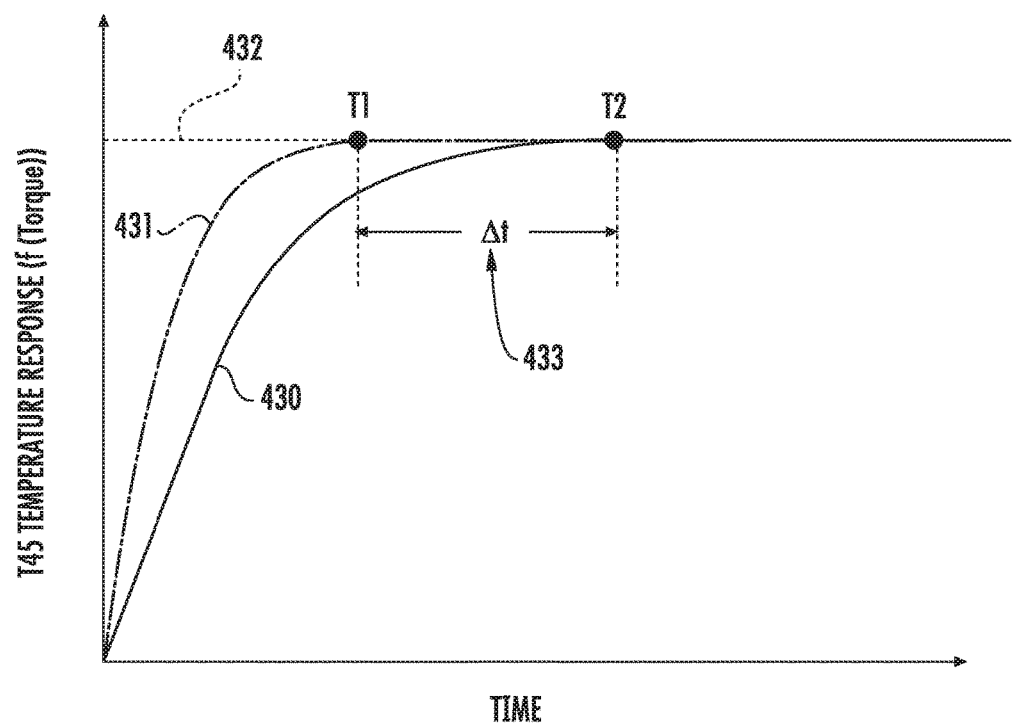
FIG. 13 provides a plot of a fuel flow response as a function of time according to an exemplary embodiment of the present disclosure.

As shown in FIG. 13 and continuing with the example above, FIG. 13 provides an exemplary plot of the T45 temperature response 430 as a function of time. For this embodiment, the T45 temperature response 430 is a function of torque on the electrical machine 246. Further, for this embodiment, the T45 temperature response 430 is for a turbofan engine that has some degree of non-negligible deterioration. When the electrical machine 246 is pulsed, the power output or perceived power output of the turbofan engine 200 is reduced due to the increased load on the electrical machine 246, as noted above. To account for the loss of power output or perceived loss of power output, the turbofan engine 200 increases its power output (e.g., by increasing the fuel flow into the combustor 270). As the turbofan engine 200 increases its power output, the temperature at T45 increases over time. When the desired power output is reached, the temperature at T45 reaches steady state, denoted by 432.

As further shown in FIG. 13, a baseline response 431 indicative of the T45 temperature response when the turbofan engine 200 was a "new make" having no or negligible deterioration is shown as a function of time. As the engine deteriorates, it takes a longer amount of time for the temperature at T45 to reach steady state 432. Accordingly, as shown, the baseline response 431 of the "new make" turbofan engine 200 achieved steady state 432 faster than the T45 temperature response 430 of the turbofan engine having some degree of deterioration. In some embodiments, to determine a health estimate 360 of the turbofan engine 200, the T45 temperature response 430 is compared to the baseline response 431. That is, for some embodiments, the point in time in which the T45 temperature response 430 reaches steady state 432 is compared to the point in time in which the baseline response 431 reaches steady state 432. As shown in FIG. 13, the baseline response 431 reaches steady state 432 at a point in time T1 and the T45 temperature response 430 reaches steady state 432 at a point in time T2. A delta 433, or difference between the two points in time T1, T2 is determined. The delta 433 is indicative of some degree of deterioration of the turbofan engine 200. Based at least in part on the delta 433, the health estimate 360 for the turbofan engine 200 can be determined.

It will be appreciated that the gas-path sensors 336 can include or can be other gas-path sensors positioned along the core air flowpath 221 of the turbofan engine 200, such as e.g., an exhaust gas temperature sensor, a pressure sensor at a particular location along the core air flowpath 221, or any other suitable sensor capable of sensing or measuring the power output of the turbofan engine 200.

Moreover, depending on the position of a gas-path sensor along the core air flowpath 221, a response to a pulse can be used to determine the health of one or more engine components positioned adjacent the gas-path sensor. For example, a gas-path sensor positioned at T45 can be used to determine the health of HP turbine 216 positioned upstream of the T45 station. In addition, where there are more than one gas-path sensors, such as e.g., a T45 sensor for measuring temperature at T45 and a P3 sensor for measuring pressure at P3, responses measured by theses to sensors to the pulsing of an electrical machine can be tracked over time and relationships between them can be determined. Based on such relationships, health estimates can be determined for one or more components of the gas turbine engine. For example, suppose the relationship the pressure at P3 is trending normally but that the temperature at T45 is trending abnormally high. In such an example, the HP turbine 216 has likely experienced deterioration to some degree, and based on the deviation from the trend of the T45 temperature, a health estimate of the HP turbine 216 can be determined.

Referring again to FIG. 10, by way of example, in some exemplary embodiments where the turbofan engine 200 includes the first electrical machine 247 coupled with the LP shaft 224 and the second electrical machine 249 coupled with the HP shaft 222, the first electrical machine 247 is pulsed 400 for a predetermined time to induce a torque on the first electrical machine 247. Thereafter, the second electrical machine sensor 332 measures a response 402 to the pulse 400. The response 402 is indicative of a change in one or more operating parameters 350 of the second electrical machine 249 over time. In particular, for this example, the second electrical machine sensor 332 measures a response 402 that is indicative of a change in power output of the second electrical machine over time, or dPower/dt. As power is a calculated value, any parameter affecting the power output of the second electrical machine 249 can be used. For example, the RPM of the rotor 248 of the second electrical machine 249, the torque input exerted on the second electrical machine 249 by the HP shaft 222 (i.e., not the countertorque), etc. are parameters indicative of the power output of the second electrical machine 149. In this way, the second electrical machine sensor 332 measures any suitable parameter such that a power response can be determined when the first electrical machine 247 is pulsed. After the response 402 to the pulse 400 of the electrical machine 246 is measured, the response 402 is utilized to determine the health estimate 360 of the turbofan engine 200 (i.e., prime mover).

Figure 14:
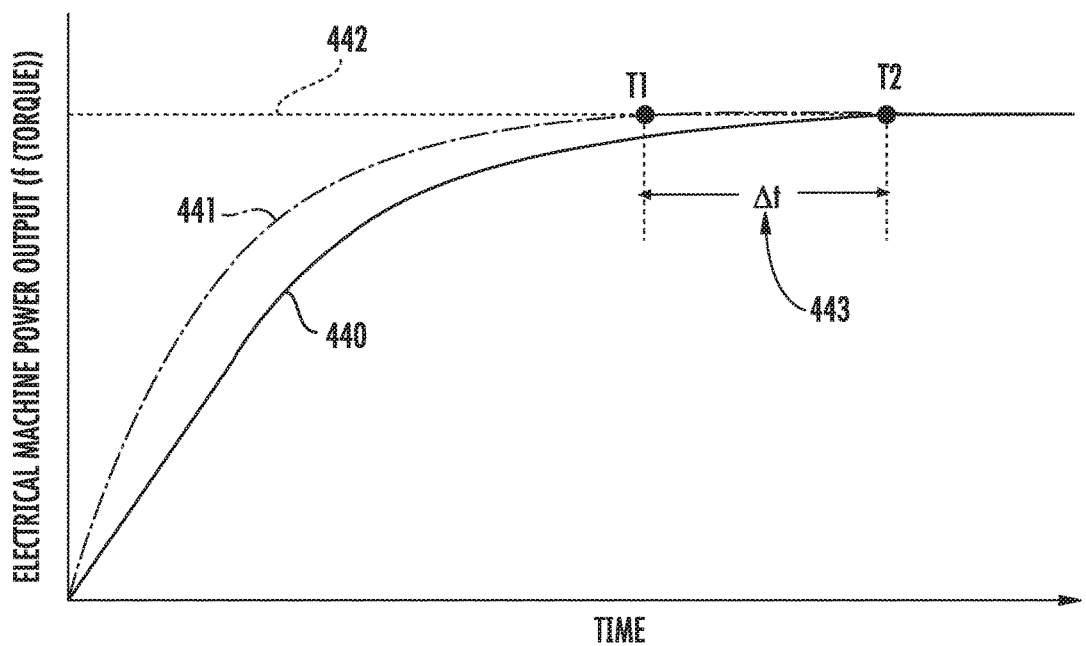
FIG. 14 provides a plot of a T45 temperature response as a function of time according to an exemplary embodiment of the present disclosure.

As shown in FIG. 14 and continuing with the example above, FIG. 14 provides an exemplary plot of the power response 440 as a function of time. For this embodiment, the power response 440 is a function of torque on the first electrical machine 247. Further, for this example, the power response 440 is for the second electrical machine 249 that has some degree of non-negligible deterioration. When the first electrical machine 247 is pulsed, the power output of the second electrical machine 249 is reduced due to the increased load on the first electrical machine 247, which as noted above, may affect fuel flow, LP shaft 224 rotational speed, HP shaft 222 rotational speed, the temperature at T45, etc. In particular, the rotational speed of the HP shaft 222 is affected, which also affects the rotational speed of the rotor 248 of the second electrical machine 249. To account for the loss of power output or perceived loss of power output, the turbofan engine 200 increases its power output (e.g., by increasing the fuel flow into the combustor 270). As the turbofan engine 200 increases its power output, the rotational speed of the HP shaft 222 gradually increases such that the turbofan engine 200 can achieve the desired power level. When the desired power output is reached, the rotational speed of the HP shaft 222 reaches steady state. However, at least in some instances, there is a time lag between when the HP shaft 222 reaches steady state to a point in time where the second electrical machine 249 reaches a steady state power output, denoted by 442. The power response 440 in FIG. 14 is indicative of the lag time, or the time it takes the second electrical machine 249 to reach a steady state power output after the HP shaft 222 reaches a steady state rotational speed.

As further shown in FIG. 14, a baseline response 441 indicative of the power response when the turbofan engine 200 and second electrical machine 249 were "new makes" having negligible deterioration is shown as a function of time. As the engine and second electrical machine 249 deteriorates, it takes a longer amount of time for the power output of the second electrical machine 249 to reach steady state 442 after the HP shaft 222 reaches a steady state rotational speed. Accordingly, as shown, the baseline response 441 of the second electrical machine 249 achieved steady state 442 faster than the power response 440 of the second electrical machine 249 having some non-negligible degree of deterioration. In some embodiments, to determine a health estimate 360 of the turbofan engine 200, the power response 440 is compared to the baseline response 441. That is, for some embodiments, the point in time in which the power response 440 reaches steady state 442 is compared to the point in time in which the baseline response 441 reaches steady state 442. As shown further in FIG. 14, the baseline response 441 reaches steady state 442 at a point in time T1 and the power response 440 reaches steady state 442 at a point in time T2. A delta 443, or difference between the two points in time T1, T2 is determined. The delta 443 is indicative of some degree of deterioration of the turbofan engine 200 and/or the second electrical machine 249. Based at least in part on the delta 443, the health estimate 360 for the turbofan engine 200 and/or the second electrical machine 249 can be determined.

As will be appreciated, in some exemplary embodiments, the second electrical machine 249 can be in electrical communication with the power source 338 such that the second electrical machine 249 can be pulsed. In such embodiments, health estimates 360 of the turbofan engine 200 and/or the first electrical machine 249 can be determined in accordance with the above.

Referring again to FIG. 10, in yet other exemplary embodiments, the electrical machine 246 need not be pulsed. Rather, during normal operation of the turbofan engine 200, the torque (i.e. the countertorque when the electrical machine 246 is or is functioning as an electric generator) on the electrical machine 246 is measured over time. In response to these changes in torque over time, a response is measured. The response is indicative of a change in one or more operating parameters 351, 350 of at least one of the turbofan engine 200 (i.e., the prime mover) and the electrical machines 246. For example, as noted above, the response can be indicative of a change in fuel flow, a change in the rotational speed of the LP shaft 224, a change in the speed of the HP shaft 222, a change in the temperature at one or more locations along the core air flowpath 221 (e.g., at T45), and in embodiments including two electrical machines 2446 (i.e., a first and second electrical machine 247, 249), the power output of one of the electrical machines. Thereafter, in a manner noted above, a health estimate 360 can be determined for at least one of the electrical machines 246 (or one or both the first and second electrical machines 247, 249) and the prime mover (i.e., the turbofan engine 200) based at least in part on the response.

Figure 15:
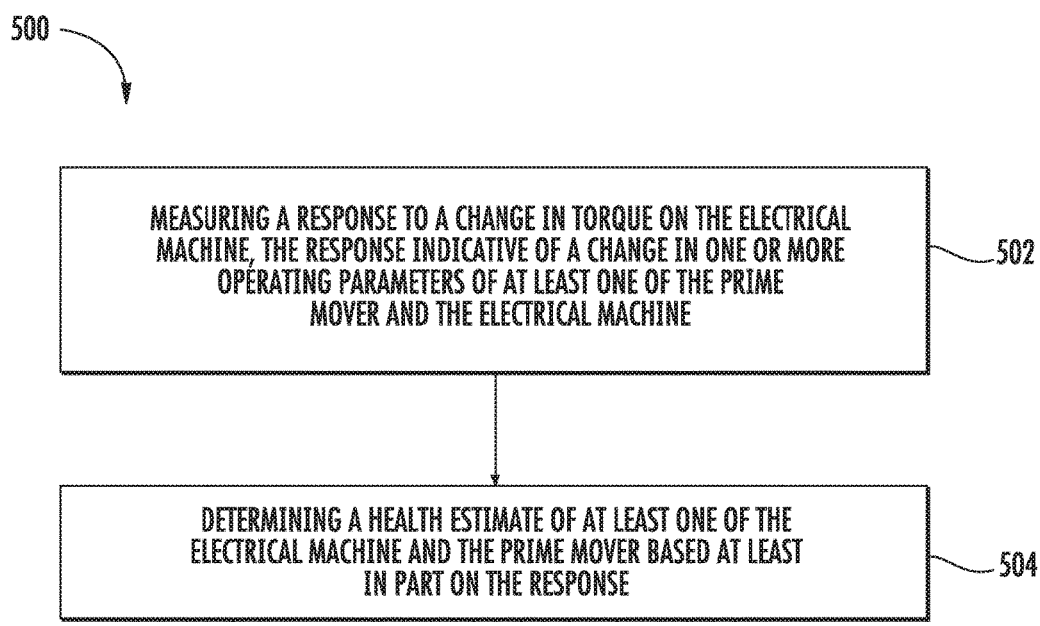
FIG. 15 provides an exemplary flow chart of an exemplary method according to an exemplary embodiment of the present disclosure.

FIG. 15 depicts a flow diagram of an exemplary method (500) for monitoring the health of at least one of a prime mover and an electrical machine coupled with the prime mover according to an exemplary embodiment of the present disclosure. Some or all of the method (500) can be implemented by the health monitoring system 300 disclosed herein. In addition, FIG. 15 depicts method (500) in a particular order for purposes of illustration and discussion. It will be appreciated that exemplary method (500) can be modified, adapted, expanded, rearranged and/or omitted in various ways without deviating from the scope of the present subject matter.

At (502), exemplary method (500) includes measuring a response 402 to a change in torque on the electrical machine 246. The response 402 is indicative of a change in one or more operating parameters 351, 350 of at least one of the prime mover, such as e.g., the turbofan engine 200 of FIG. 3, and the electrical machine 246. In some implementations, the change in the one or more operating parameters is indicative of a power output or change in a power output of the prime mover.

At (504), exemplary method (500) includes determining a health estimate of at least one of the electrical machine and the prime mover based at least in part on the response.

In some exemplary implementations, prior to measuring the response, the exemplary method (500) further includes pulsing the electrical machine for a predetermined time to induce the change in torque on the electrical machine.

In some exemplary implementations, when determining the health estimate, the exemplary method (500) further includes comparing the response to a baseline response; determining a delta between the response and the baseline response; and, based at least in part on the delta between the response and the baseline response the health estimate is determined.

Figure 16:
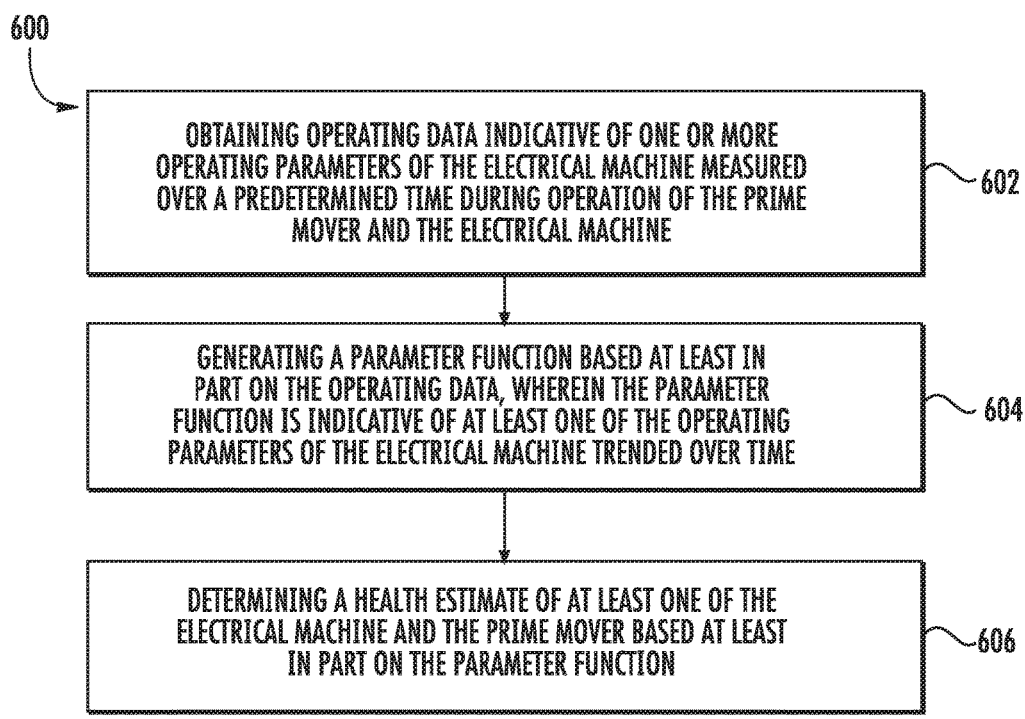
FIG. 16 provides another exemplary flow chart of an exemplary method according to an exemplary embodiment of the present disclosure.

FIG. 16 depicts a flow diagram of an exemplary method (600) for estimating a health estimate of at least one of a prime mover and an electrical machine coupled with the prime mover according to an exemplary embodiment of the present disclosure. Some or all of the method (600) can be implemented by the health monitoring system 300 disclosed herein. In addition, FIG. 16 depicts method (600) in a particular order for purposes of illustration and discussion. It will be appreciated that exemplary method (600) can be modified, adapted, expanded, rearranged and/or omitted in various ways without deviating from the scope of the present subject matter.

At (602), exemplary method (600) includes obtaining operating data indicative of one or more operating parameters of the electrical machine measured over a predetermined time during operation of the prime mover and the electrical machine.

At (604), exemplary method (600) includes generating a parameter function based at least in part on the operating data, wherein the parameter function is indicative of at least one of the operating parameters of the electrical machine trended over time.

At (606), exemplary method (600) includes determining a health estimate of at least one of the electrical machine and the prime mover based at least in part on the parameter function.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for monitoring the health of at least one of a prime mover and an electrical machine coupled with the prime mover, the method comprising:
    pulsing the electrical machine to induce a change in torque on the electrical machine;
    measuring a response to the change in torque on the electrical machine caused by pulsing of the electrical machine, the response indicative of a change in one or more operating parameters of the prime mover; and
    determining a health estimate of at least one of the electrical machine and the prime mover based at least in part on the response.

2. The method of claim 1, wherein pulsing the electrical machine to induce the change in torque on the electrical machine comprises pulsing, via a film foil capacitor, the electrical machine to induce the change in torque on the electrical machine.

3. The method of claim 1, wherein during determining, the method further comprises:
    comparing the response to a baseline response; and
    determining a delta between the response and the baseline response;
    wherein the health estimate is based at least in part on the delta between the response and the baseline response.

4. The method of claim 1, wherein the change in the one or more operating parameters is indicative of a change in a power output of the prime mover.

5. The method of claim 1, wherein the response is a fuel flow response indicative of a change in fuel flow of the prime mover.

6. The method of claim 1, wherein the prime mover is a gas turbine engine defining an axial direction and having a low pressure shaft and a high pressure shaft each rotatable about the axial direction, the electrical machine coupled to at least one of the low pressure shaft and the high pressure shaft and at least partially rotatable about the axial direction, and wherein the response is at least one of a N1 speed response and an N2 response indicative of the low pressure shaft and the high pressure shaft of the gas turbine engine, respectively.

7. The method of claim 1, wherein the prime mover is a gas turbine engine defining an axial direction and comprising a low pressure shaft and a high pressure shaft each rotatable about the axial direction, and wherein the electrical machine is a first electrical machine coupled to the low pressure shaft and at least partially rotatable about the axial direction, and wherein the gas turbine engine further comprises a second electrical machine coupled to the high pressure shaft and at least partially rotatable about the axial direction, and wherein the response is a power response indicative of a power output of the second electrical machine of the gas turbine engine.

8. The method of claim 1, wherein the prime mover is a gas turbine engine and the electrical machine is an electrical generator.

9. A method for monitoring the health of at least one of a prime mover and an electrical machine coupled with the prime mover, the method comprising:
    obtaining operating data indicative of one or more operating parameters of the electrical machine measured over a predetermined time during operation of the prime mover and the electrical machine;
    generating a parameter function based at least in part on the operating data, wherein the parameter function is indicative of at least one of the operating parameters of the electrical machine trended from a present time to at least a future time in which the parameter function intersects a predetermined threshold indicative of a value in which the electrical machine is no longer able to supply a predetermined power output to a load connected thereto; and
    determining a health estimate of at least one of the electrical machine and the prime mover based at least in part on the parameter function.

10. The method of claim 9, wherein the method further comprises:
    obtaining operating data indicative of one or more operating parameters of the prime mover measured over a predetermined time during operation of the prime mover and the electrical machine;
    generating a parameter function based at least in part on the operating data, wherein the parameter function is indicative of at least one of the operating parameters of the prime mover trended over time; and
    wherein, during determining, the health estimate is determined based at least in part on the parameter function of the electrical machine and the parameter function of the prime mover.

11. The method of claim 9, wherein the health estimate is indicative of a useful life remaining of at least one of the prime mover and the electrical machine, and wherein the useful life remaining is determined based at least in part on an intersection of the parameter function and the predetermined threshold.

12. The method of claim 9, wherein the one or more operating parameters include at least one of a current flow through the electrical machine, a voltage across the electrical machine, and a torque on the electrical machine.

13. The method of claim 9, wherein prior to generating, the method further comprises:
    normalizing the one or more operating data; and
    providing information to a user indicative of the health estimate of at least one of the prime mover and the electrical machine.

14. The method of claim 12, wherein during normalizing, the one or more operating parameters are normalized for variation in an operating condition and a power setting of the prime mover.

15. A gas turbine engine defining a radial direction and an axial direction, the gas turbine engine comprising:
    a compressor section, a combustion section, and a turbine section arranged in serial flow order, the compressor section, the combustion section, and the turbine section at least partially defining a core air flowpath;
    one or more sensors for sensing one or more operating parameters of the gas turbine engine during operation;
    a rotary component rotatable with at least one of a portion of the compressor section and a portion of the turbine section;

a static frame member;

an electric machine rotatable with the rotary component, the electric machine mounted to the static frame member or coupled to the rotary component, or both;

a power source; and a health monitoring system comprising one or more computing devices communicatively coupled with the electrical machine and the one or more sensors, the one or more computing devices comprising one or more processors and one or more memory devices, the one or more memory devices storing instructions that when executed by the one or more processors cause the one or more processors to perform operations, the one or more computing devices configured to:

cause the power source to pulse the electrical machine;

obtain one or more signals from the one or more sensors indicative of a response to a change in torque on the electrical machine caused by pulsing the electrical machine via the power source, the response indicative of a change in one or more operating parameters of the gas turbine engine;

compare the response to a baseline response;

determine a delta between the response and the baseline response; and determine a health estimate of the gas turbine engine based at least in part on the delta between the response and the baseline response.

16. The gas turbine engine of claim 15, wherein the change in the one or more operating parameters is indicative of a change in a power output of the gas turbine engine.

17. The gas turbine engine of claim 15, wherein the combustion section includes a fuel delivery system for delivering fuel, and wherein the response is a fuel flow response indicative of a fuel flow delivered by the fuel delivery system to the combustion section of the gas turbine engine.

18. The gas turbine engine of claim 15, wherein the rotary component of the gas turbine engine includes at least one of a low pressure shaft and a high pressure shaft each rotatable about the axial direction, the electrical machine coupled to at least one of the low pressure shaft and the high pressure shaft, and wherein the response is at least one of a N1 speed response and an N2 response indicative of the low pressure shaft and the high pressure shaft of the gas turbine engine, respectively.

19. The gas turbine engine of claim 15, wherein in causing the power source to pulse the electrical machine, the one or more computing devices are configured to cause the power source to pulse the electrical machine in at least one of a stepwise and a sinusoidal manner.

20. The gas turbine engine of claim 15, wherein the gas turbine engine includes a gas-path sensor positioned along the core air flowpath for measuring one or more operating parameters during operation of the gas turbine engine, and wherein during determining the health estimate, the computing device utilizes the operating parameters measured by the gas-path sensor in conjunction with the operating parameters measured by the sensors to determine the health estimate of at least one of the gas turbine engine and the electrical machine.

* * * * *